(12) United States Patent
Shin et al.

(10) Patent No.: US 12,339,424 B2
(45) Date of Patent: Jun. 24, 2025

(54) IMAGING LENS SYSTEM AND CAMERA MODULE

(71) Applicant: SAMSUNG ELECTRO-MECHANICS CO., LTD., Suwon-si (KR)

(72) Inventors: Kil Soo Shin, Suwon-si (KR); Yong Joo Jo, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 515 days.

(21) Appl. No.: 17/721,617

(22) Filed: Apr. 15, 2022

(65) Prior Publication Data

US 2023/0119848 A1 Apr. 20, 2023

(30) Foreign Application Priority Data

Sep. 30, 2021 (KR) .................. 10-2021-0129628

(51) Int. Cl.
*G02B 13/00* (2006.01)
*G02B 9/64* (2006.01)

(52) U.S. Cl.
CPC .......... *G02B 13/0045* (2013.01); *G02B 9/64* (2013.01)

(58) Field of Classification Search
None
See application file for complete search history.

(56) References Cited

U.S. PATENT DOCUMENTS

| | | |
|---|---|---|
| 2017/0045714 A1 | 2/2017 | Huang |
| 2017/0082835 A1 | 3/2017 | Tang et al. |
| 2018/0180856 A1 | 6/2018 | Jung et al. |
| 2019/0033558 A1 | 1/2019 | Chang et al. |
| 2019/0056568 A1 | 2/2019 | Huang |
| 2019/0101729 A1 | 4/2019 | Hsieh et al. |
| 2019/0204559 A1 | 7/2019 | Jhang et al. |
| 2019/0204560 A1* | 7/2019 | Jhang .................. G02B 9/64 |
| 2019/0235212 A1 | 8/2019 | Chen |
| 2020/0201002 A1 | 6/2020 | Xu et al. |

FOREIGN PATENT DOCUMENTS

| | | |
|---|---|---|
| CN | 106443986 A | 2/2017 |
| CN | 107643586 A | 1/2018 |
| CN | 107703609 A | 2/2018 |
| CN | 107741630 A | 2/2018 |

(Continued)

OTHER PUBLICATIONS

Chinese Office Action issued on Mar. 1, 2024, in counterpart Chinese Patent Application No. 202210784586.X (4 pages in English, 8 pages in Chinese).

(Continued)

*Primary Examiner* — Robert E. Tallman
(74) *Attorney, Agent, or Firm* — NSIP Law

(57) ABSTRACT

An imaging lens system includes a first lens, a second lens, a third lens, a fourth lens, a fifth lens, a sixth lens, a seventh lens, and an eighth lens sequentially disposed from an object-side, wherein 0.15<BFL/TTL and 1.9 mm<BFL<2.8 mm are satisfied, where BFL is a distance from an image-side surface of the eighth lens to an imaging plane and TTL is a distance from an object-side surface of the first lens to the imaging plane.

24 Claims, 24 Drawing Sheets

(56) References Cited

FOREIGN PATENT DOCUMENTS

| | | |
|---|---|---|
| CN | 207164344 U | 3/2018 |
| CN | 207424361 U | 5/2018 |
| CN | 108107545 A | 6/2018 |
| CN | 108254890 A | 7/2018 |
| CN | 113359282 A | 9/2021 |
| TW | I730772 B | 6/2021 |
| TW | 202129340 A | 8/2021 |

OTHER PUBLICATIONS

Taiwanese Office Action issued on Sep. 26, 2022, in counterpart Taiwanese Patent Application No. 111115252 (6 pages in English and 7 pages in Chinese).
Chinese Office Action issued on Feb. 10, 2025, in corresponding Chinese Patent Application No. 202210784586.X. (5pages in English, 6pages in Chinese).

* cited by examiner

I - I

I - I

IMAGING LENS SYSTEM AND CAMERA MODULE

CROSS-REFERENCE TO RELATED APPLICATIONS

This application claims the benefit under 35 USC 119(a) of Korean Patent Application No. 10-2021-0129628 filed on Sep. 30, 2021, in the Korean Intellectual Property Office, the entire disclosure of which is incorporated herein by reference for all purposes.

BACKGROUND

1. Field

The present disclosure relates to an imaging lens system and an imaging lens system mountable in portable electronic devices.

2. Description of the Background

Portable electronic devices include a camera module for capturing images or videos. For example, the camera module may be mounted in a mobile phone, a notebook computer, a game machine, or the like.

Resolution of camera modules and imaging lens systems may be proportional to the size of sensors and imaging planes. For example, in order to implement a high-resolution camera module and an imaging lens system, a sensor and an imaging plane having a considerable size are required. However, since the size (or length) of the camera module and the imaging lens system increases in proportion to the size of the sensor and the imaging plane, it may be difficult to mount the high-resolution camera module and the imaging lens system in a thinned electronic device such as a smartphone.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an imaging lens system includes a first lens, a second lens, a third lens, a fourth lens, a fifth lens, a sixth lens, a seventh lens, and an eighth lens sequentially disposed from an object-side, wherein 0.15<BFL/TTL and 1.9 mm<BFL<2.8 mm are satisfied, where BFL is a distance from an image-side surface of the eighth lens to an imaging plane and TTL is a distance from an object-side surface of the first lens to the imaging plane.

ImgHT may be greater than or equal to 5.0 mm and less than or equal to 9.0 mm, where ImgHT is a height of the imaging plane.

T1/ImgHT may be greater than 0.1 and less than 0.2, where T1 is a thickness of the first lens at the center of an optical axis.

f1/f may be greater than 0 and less than 2.0, where f1 is a focal length of the first lens and f is a focal length of the imaging lens system.

f2/f may be greater than −3.5 and less than 0, where f2 is a focal length of the second lens. TTL/f may be greater than 0.8 and less than 1.2.

(TTL-BFL)/2ImgHT may be less than 0.65, where 2ImgHT is a diagonal length of the imaging plane.

f7/f may be greater than 0 and less than 0.8, where f7 is a focal length of the seventh lens.

SUMT/BFL may be greater than 1.3 and less than 2.8, where SUMT is a sum of thicknesses of the first to eighth lens in the center of the optical axis.

A camera module may include the imaging lens system, and an image sensor including an imaging surface disposed at the imaging plane of the imaging lens system, wherein the image sensor may convert an image of an object formed on an effective imaging area of the imaging surface by the lenses of the imaging lens system into an electrical signal.

A portable terminal may include a housing, and the camera module may be disposed in the housing.

In another general aspect, an imaging lens system includes a first lens having positive refractive power, a second lens having refractive power, a third lens having positive refractive power, a fourth lens having refractive power, a fifth lens having refractive power, and a sixth lens having negative refractive power, wherein 2.0<DL1LP/BFL<5.4 is satisfied, where DL1LP is a distance from an object-side surface of the first lens to an image-side surface of a rearmost lens, a lens closest to an imaging plane, and BFL is a distance from the image-side surface of the rearmost lens to the imaging plane.

The fourth lens may have negative refractive power.
The fifth lens may have positive refractive power.
The fourth lens may have a concave image-side surface.
BFL/TTL may be greater than 0.15 and less than 0.40.
TTL/f may be greater than 1.0 and less than 1.3.

A camera module may include the imaging lens system, and an image sensor having an imaging surface disposed at the imaging plane of the imaging lens system, wherein the image sensor may convert an image of an object formed on an effective imaging area of the imaging surface by the lenses of the imaging lens system into an electrical signal, and wherein the imaging lens system may be movable toward the image sensor and (BFLx−BFLm)/BFLx may be greater than 0.6 and less than 0.8, where BFLx is a distance from an image-side surface of a rearmost lens closest to the image sensor to the image sensor in a state in which the imaging lens system is located farthest from the image sensor, and BFLm is a distance from the image-side surface of the rearmost lens to the image sensor in a state in which the imaging lens system is located closest to the image sensor.

In another general aspect, a camera module includes an imaging lens system including a first lens, a second lens, a third lens, a fourth lens, a fifth lens, and a sixth lens being sequentially arranged from an object-side surface, and an image sensor, wherein the imaging lens system is movable toward the image sensor and 0.6<(BFLx−BFLm)/BFLx<0.8 is satisfied, where BFLx is a distance from an image-side surface of a rearmost lens closest to the image sensor to the image sensor in a state in which the imaging lens system is located farthest from the image sensor, and BFLm is a distance from the image-side surface of the rearmost lens to the image sensor in a state in which the imaging lens system is located closest to the image sensor.

The imaging lens system may further include one or more additional lenses disposed on an image side of the sixth lens toward the image sensor, and wherein BFL/TTL may be greater than 0.15, and BFL may be greater than 1.9 mm.

A portable terminal may include a housing, the camera module disposed in the housing, and one or more other camera modules.

In another general aspect, a camera module includes a first barrel accommodating a second barrel, an imaging lens system disposed in the second barrel, and an image sensor disposed in the first barrel, and including an imaging surface disposed at the imaging plane of the imaging lens system, wherein the second barrel is movable to at least partially protrude from the first barrel, wherein the imaging lens system includes seven or more lenses, and wherein 0.15<BFL/TTL and 1.9 mm<BFL are satisfied, where BFL is a distance from an image-side surface of the rearmost lens closest to the image sensor to the imaging plane and TTL is a distance from an object-side surface of the first lens to the imaging plane.

The seven or more lenses may include a first lens having positive refractive power, a second lens having refractive power, a third lens having positive refractive power, a fourth lens having refractive power, a fifth lens having refractive power, and a sixth lens having negative refractive power, wherein the first lens through sixth lens may be sequentially disposed from an object-side.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
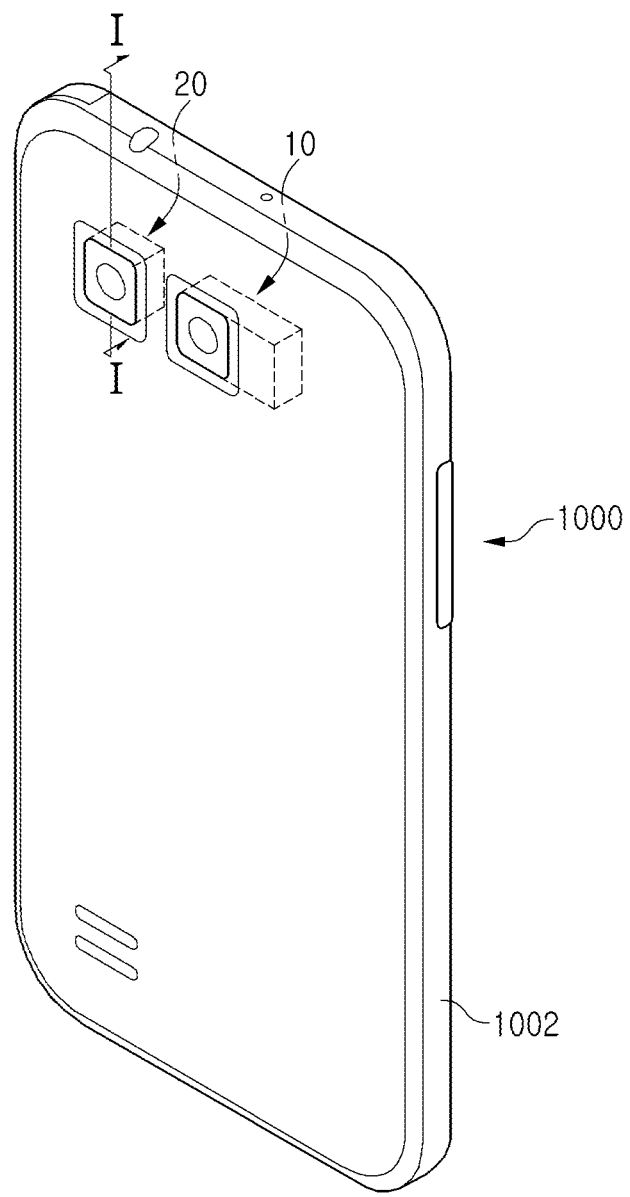
FIG. 1 is a perspective view of a portable terminal equipped with a camera module according to an one or more example embodiments.

Hereinafter, while example embodiments of the present disclosure are described in detail with reference to the accompanying illustrative drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, for example, as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element would then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of this disclosure. Further, although the examples described herein have a variety of configurations, other configurations are possible as will be apparent after gaining an understanding of this disclosure.

Example embodiments described herein provide an imaging lens system configured to be mounted in a portable electronic device.

In the present disclosure, a first lens refers to a lens closest to an object (or subject), and a sixth, seventh, or eighth lens, depending on whether there are six, seven or eight total lenses in the lens system, respectively, refers to a lens closest to an imaging plane (or an image sensor). In the present disclosure, all radii of curvature, thicknesses, TTL (a distance from an object-side surface of the first lens to an imaging plane), 2ImgHT (a diagonal length of the imaging plane), ImgHT (an image height or ½ of 2ImgHT), and a focal length are indicated in millimeters (mm).

The thickness of the lenses, the distance between the lenses, and TTL are the distances along an optical axis of the lenses. In addition, in the description of the shape of the lenses, a convex shape of one surface means that a paraxial region of the corresponding surface is convex, and a concave shape of one surface means that a paraxial region of the corresponding surface is concave. Therefore, even if it is described that one surface of the lens has a convex shape, an edge portion of the lens may be concave. Similarly, even if one surface of the lens is described as having a concave shape, the edge portion of the lens may be convex.

An optical imaging system including the imaging lens system may further include other elements in addition to the first to sixth, seventh, or eighth lenses.

The optical imaging system may further include at least one stop disposed before the first lens, or between any two adjacent lenses of the first to sixth, seventh, or eighth lenses, or between the sixth, seventh, or eighth lens and the imaging plane. The optical imaging system may include two or more stops disposed at different locations.

The optical imaging system may further include an image sensor having an imaging surface disposed at the imaging plane of the imaging lens system. The image sensor converts an image of an object formed on an effective imaging area of the imaging surface by the lenses of the imaging lens system into an electrical signal.

The optical imaging system may further include an infrared blocking filter, hereinafter referred to as a filter, for blocking infrared light. The filter may be disposed between the sixth, seventh, or eighth lens and the imaging plane.

The optical imaging system may further include at least one reflective member having a reflective surface that changes a direction of an optical path in the optical imaging system. For example, the reflective member may be a prism or a mirror.

For example, the reflective member may be disposed in the optical path on the object-side of the first lens, between any two lenses among the second to sixth, seventh, or eighth lenses, or on the image-side of the sixth, seventh, or eighth lens.

For example, the optical imaging system may further include a first reflective member disposed in an optical path between the object side of the optical imaging system and the object-side surface of the first lens. Therefore, the first lens may be a lens disposed closest to the first reflective member among the first to sixth, seventh, or eighth lenses.

Also, the optical imaging system may further include a second reflective member disposed in an optical path between the image-side surface of the sixth, seventh, or eighth lens and the imaging plane. Therefore, the sixth, seventh, or eighth lens may be a lens disposed closest to the second reflective member among the first to sixth, seventh, or eighth lenses.

The imaging lens system described herein may be configured to be mounted in a portable electronic device. For example, the imaging lens system may be mounted in smartphones, notebook computers, augmented reality (AR) devices, virtual reality (VR) devices, portable game machines, or the like. However, a range and examples of use of the imaging lens system described in the present disclosure are not limited to the electronic devices described above. For example, the imaging lens system may be applied to an electronic device providing a narrow mounting space but requiring high-resolution imaging.

An imaging lens system according to one or more example embodiments of the present disclosure may include a plurality of lenses. For example, the imaging lens system may include a first lens, a second lens, a third lens, a fourth lens, a fifth lens, a sixth lens, a seventh lens, and an eighth lens sequentially arranged from the object-side surface. However, the lens constituting the imaging lens system is not limited to eight lenses. For example, the imaging lens system may include no more than six lenses or no more than seven lenses.

The imaging lens system according to one aspect may be configured such that a distance BFL from the rearmost lens to the imaging plane is formed to have a significant size. For example, in the optical system described in the present disclosure, the distance BFL from the image-side surface of the eighth lens, which is the rearmost lens, to the imaging plane may be greater than 1.9 mm and less than 2.8 mm.

In addition, the BFL may be configured to have a predetermined relationship with a length of the imaging lens system (a distance from the object-side surface of the first lens to the imaging plane, which is the forwardmost lens: TTL). For example, BFL/TTL may be greater than 0.15.

The imaging lens system according to another aspect of the present disclosure may include a plurality of lenses. For example, the imaging lens system may include a first lens, a second lens, a third lens, a fourth lens, a fifth lens, a sixth lens, a seventh lens, and an eighth lens sequentially arranged from the object-side surface.

An imaging lens system according to another aspect may include a lens having a predetermined refractive power. For example, the imaging lens system according to the present example embodiment may include a first lens having positive refractive power and a third lens having positive refractive power.

In the imaging lens system according to this aspect, a distance from the first lens to the eighth lens may be formed to have a considerable size. For example, a distance D18 from the object-side surface of the first lens to the image-side surface of the eighth lens may be significantly greater than the distance BFL from the image-side surface of the eighth lens to the imaging plane. To elaborate, D18/BFL may be greater than 2.0 and less than 4.2.

An imaging lens system according to another aspect of the present disclosure may include a first lens, a second lens, a third lens, a fourth lens, a fifth lens, a sixth lens, a seventh lens, and an eighth lens sequentially arranged from the object-side surface. Also, one or more of the following conditional expressions may be satisfied.

$25<V1-V2<45$ $-10<V1-V3<25$ $25<V1-V4<50$ $-10<V1-V5<25$ $0<f1/f<2.0$ $-3.5<f2/f<0$ $1.5<f3/f$ $-100<f4/f<300$ $f5/f<150$ $-10<f6/f<10$ $0<f7/f$ $f8/f<0$ $TTL/f<1.5$ $-1.0<f1/f2<0$ $-2.0<f2/f3<0$ $BFL/f<0.4$ $D12/f<0.3$ $TTL/2ImgHT<0.8$ $(TTL-BLF)/2ImgHT<0.65$ $0.15<BFL/TTL$

In the above conditional expressions, V1 is the Abbe number of the first lens, V2 is the Abbe number of the second lens, V3 is the Abbe number of the third lens, V4 is the Abbe number of the fourth lens, V5 is the Abbe number of the fifth lens, f is a focal length of the imaging lens system, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, f8 is a focal length of the eighth lens, TTL is a distance from the object-side surface of the first lens to the imaging plane, BFL is a distance from the image-side surface of the eighth lens to the imaging plane, D12 is a distance from the image-side surface of the first lens to an object-side surface of the second lens, and 2ImgHT is a diagonal length of the imaging plane.

The imaging lens system may satisfy some of the conditional expressions described above in a more limited form as follows.

$1.5<f3/f<50$ $10<f5/f<150$ $0<f7/f<0.8$ $-1.0<f8/f<0$ $0.8<TTL/f<1.3$ $0.19<BFL/f<0.40$ $0<D12/f<0.3$ $0.6<TTL/2ImgHT<0.8$ $0.4<(TTL-BLF)/2ImgHT<0.62$ $0.15<BFL/TTL<0.4$

An imaging lens system according to another aspect of the present disclosure may include a first lens, a second lens, a third lens, a fourth lens, a fifth lens, a sixth lens, a seventh lens, and an eighth lens sequentially arranged from the object-side surface and may satisfy one or more of the following conditional expressions.

$5.0\ mm \leq ImgHT \leq 9.0\ mm$ $0.1<T1/ImgHT<0.2$ $0.2<BFL/ImgHT<0.5$ $2.0<DL1LP/BFL<4.2$ $0.6<EPD/ImgHT<0.8$ $1.3<EPD/BFL<3.2$ $1.1<SUMT/SUMD<2.3$ $1.3<SUMT/BFL<3.0$ $0.7<SUMD/BFL<2.6$ In the above conditional expressions, ImgHT is an image height (a height of the imaging plane), T1 is a thickness of the first lens at the center of an optical axis, DL1LP is a distance from the object-side surface of the first lens to an image-side surface of the rearmost lens (the lens closest to the imaging plane), EPD is a diameter of an entrance pupil, SUMT is the sum of thicknesses of the first lens to the eighth lens, and SUMD is the sum of the air gaps between the lenses (i.e., an air gap between the first and second lenses, an air gap between the second lens and the third lens, an air gap between the third lens and the fourth lens, an air gap between the fourth lens and the fifth lens, an air gap between the fifth lens and the sixth lens, an air gap between the sixth lens and the seventh lens, and an air gap between the seventh and eighth lens). For reference, the air gap between the lenses is a distance from the image-side surface of the lens disposed in the front (object-side surface) to the object-side surface of the lens disposed at the rear (image-side surface).

The imaging lens system may satisfy some of the conditional expressions described above in a more limited form as follows.

$$0.62 < EPD/ImgHT < 0.72$$

$$1.6 < EPD/BFL < 2.6$$

$$1.4 < SUMT/SUMD < 2.0$$

$$1.6 < SUMT/BFL < 2.4$$

$$1.0 < SUMD/BFL < 2.0$$

The imaging lens system according to the aspect described above may include one or more lenses having the following characteristics. For example, the imaging lens system according to a first aspect may include one of the first to eighth lenses according to the following characteristics. As another example, the imaging lens system according to a second aspect may include two or more of the first to eighth lenses according to the following characteristics. However, the imaging lens systems according to the aspects described above do not necessarily include the lenses according to the following characteristics.

Hereinafter, characteristics of the first to eighth lenses are described.

The first lens has refractive power. For example, the first lens may have positive refractive power. The first lens includes a spherical surface or an aspherical surface. For example, both surfaces of the first lens may be aspherical. The first lens may be formed of a material having high light transmittance and excellent workability. For example, the first lens may be formed of a plastic material or a glass material. The first lens may be configured to have a predetermined refractive index. For example, the refractive index of the first lens may be less than 1.6. As an example, the refractive index of the first lens may be greater than 1.52 and less than 1.57. The first lens may have a predetermined Abbe number. For example, the Abbe number of the first lens may be less than 60. As an example, the Abbe number of the first lens may be greater than 53 and less than 58.

The second lens has refractive power. The second lens includes a spherical surface or an aspherical surface. For example, both surfaces of the second lens may be aspherical. The second lens may be formed of a material having high light transmittance and excellent workability. For example, the second lens may be formed of a plastic material or a glass material. The second lens may be configured to have a predetermined refractive index. For example, the refractive index of the second lens may be greater than 1.6. As an example, the refractive index of the second lens may be greater than 1.63 and less than 1.69. The second lens may have a predetermined Abbe number. For example, the Abbe number of the second lens may be less than 30. As an example, the Abbe number of the second lens may be greater than 18 and less than 24.

The third lens has refractive power. For example, the third lens may have positive refractive power. The third lens includes a spherical surface or an aspherical surface. For example, both surfaces of the third lens may be aspherical. The third lens may be formed of a material having high light transmittance and excellent workability. For example, the third lens may be formed of a plastic material or a glass material. The third lens may be configured to have a predetermined refractive index. For example, the refractive index of the third lens may be less than 1.6. As an example, the refractive index of the third lens may be greater than 1.52 and less than 1.57. The third lens may have a predetermined Abbe number. For example, the Abbe number of the third lens may be less than 60. As an example, the Abbe number of the third lens may be greater than 53 and less than 58.

The fourth lens has refractive power. One side of the fourth lens may be concave. For example, the fourth lens may have a concave image-side surface. The fourth lens includes a spherical surface or an aspherical surface. For example, both surfaces of the fourth lens may be aspherical. The fourth lens may be formed of a material having high light transmittance and excellent workability. For example, the fourth lens may be formed of a plastic material or a glass material. The fourth lens may be configured to have a predetermined refractive index. For example, the refractive index of the fourth lens may be greater than 1.6. As an example, the refractive index of the fourth lens may be greater than 1.60 and less than 1.69. The fourth lens may have a predetermined Abbe number. For example, the Abbe number of the fourth lens may be less than 30. As an example, the Abbe number of the fourth lens may be greater than 20 and less than 27.

The fifth lens has refractive power. For example, the fifth lens may have positive refractive power. The fifth lens includes a spherical surface or an aspherical surface. For example, both surfaces of the fifth lens may be aspherical. The fifth lens may be formed of a material having high light transmittance and excellent workability. For example, the fifth lens may be formed of a plastic material or a glass material. The fifth lens may be configured to have a predetermined refractive index. For example, the refractive index of the fifth lens may be less than 1.6. As an example, the refractive index of the fifth lens may be greater than 1.52 and less than 1.57. The fifth lens may have a predetermined Abbe number. For example, the Abbe number of the fifth lens may be less than 60. As an example, the Abbe number of the fifth lens may be greater than 53 and less than 58.

The sixth lens has refractive power. For example, the sixth lens may have a negative refractive power. The sixth lens includes a spherical surface or an aspherical surface. For example, both surfaces of the sixth lens may be aspherical. One or both surfaces of the sixth lens may have an inflection point. For example, an inflection point may be formed on an object-side surface and an image-side surface of the sixth lens. In addition, concave and convex shapes may be formed together on one or both surfaces of the sixth lens. For example, an optical axis portion of the sixth lens may be convex on the object-side surface, and a peripheral portion of the optical axis may be concave on the object-side surface of the sixth lens. As another example, the optical axis portion may be concave on an image-side surface of the sixth lens, and a peripheral portion of the optical axis may be convex on the image-side surface of the sixth lens. The sixth lens may be formed of a material having high light transmittance and excellent workability. For example, the sixth lens may be formed of a plastic material or a glass material. The sixth lens may be configured to have a predetermined refractive index. For example, the refractive index of the sixth lens may be less than 1.6. As an example, the refractive index of the sixth lens may be greater than 1.54 and less than 1.59. The sixth lens may have a predetermined Abbe number. For example, the Abbe number of the sixth lens may be less than 40. As an example, the Abbe number of the sixth lens may be greater than 30 and less than 40.

The seventh lens has refractive power. The seventh lens includes a spherical surface or an aspherical surface. For example, both surfaces of the seventh lens may be aspherical. An inflection point may be formed on one or both surfaces of the seventh lens. For example, an inflection point may be formed on an object-side surface and an image-side surface of the seventh lens. In addition, concave and convex shapes may be formed together on one or both surfaces of the seventh lens. For example, an optical axis portion of the seventh lens on the object-side surface may be convex, and a peripheral portion of the optical axis may be concave on the object-side surface of the seventh lens. As another example, the optical axis portion may be concave on the image-side surface of the seventh lens, and the peripheral portion of the optical axis may be convex on the image-side surface of the seventh lens. The seventh lens may be formed of a material having high light transmittance and excellent workability. For example, the seventh lens may be formed of a plastic material or a glass material. The seventh lens may be configured to have a predetermined refractive index. For example, the refractive index of the seventh lens may be less than 1.6. As an example, the refractive index of the seventh lens may be greater than 1.52 and less than 1.57. The seventh lens may have a predetermined Abbe number. For example, the Abbe number of the seventh lens may be less than 60. As an example, the Abbe number of the seventh lens may be greater than 53 and less than 58.

The eighth lens has refractive power. The eighth lens includes a spherical surface or an aspherical surface. For example, both surfaces of the eighth lens may be aspherical. An inflection point may be formed on one or both surfaces of the eighth lens. For example, an inflection point may be formed on an object-side surface and an image-side surface of the eighth lens. In addition, concave and convex shapes may be formed on one or both surfaces of the eighth lens. For example, an optical axis portion of the eighth lens may be convex on the object-side surface, and a peripheral portion of the optical axis may be concave on the object-side surface of the eighth lens. As another example, the optical axis portion may be concave on the object-side surface of the eighth lens, and peripheral portion of the optical axis may be convex on the object-side surface of the eighth lens. As another example, the optical axis portion may be concave on the image-side surface of the eighth lens, and the peripheral portion of the optical axis may be convex on the image-side surface of the eighth lens. The eighth lens may be formed of a material having high light transmittance and excellent processability. For example, the eighth lens may be formed of a plastic material or a glass material. The eighth lens may be configured to have a predetermined refractive index. For example, the refractive index of the eighth lens may be less than 1.6. As an example, the refractive index of the eighth lens may be greater than 1.52 and less than 1.57. The eighth lens may have a predetermined Abbe number. For example, the Abbe number of the eighth lens may be less than 60. As an example, the Abbe number of the eighth lens may be greater than 53 and less than 58.

The first to eighth lenses may include a spherical surface or an aspherical surface as described above. When the first to eighth lenses include an aspherical surface, the aspherical surface of the corresponding lens may be expressed by Equation 1.

$$Z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \qquad \text{Equation 1}$$

In Equation 1, c is a reciprocal of a radius of curvature of the corresponding lens, k is a conic constant, r is a distance from a certain point on the aspherical surface to the optical axis, A to H and J are aspherical constants, and Z (or SAG) is a height from a certain point on the aspherical surface to a vertex of the corresponding aspherical surface in the optical axis direction.

The imaging lens system according to one or more of the example embodiments described above, or the form described above may further include a stopper and a filter. As an example, the imaging lens system may further include a stop disposed between the second lens and the third lens or between the third lens and the fourth lens. As another example, the imaging lens system may further include a filter disposed between the eighth lens and the imaging plane. The stop may be configured to adjust the amount of light incident in a direction of the imaging plane and the filter may be configured to block light of a specific wavelength. For reference, the filter described herein is configured to block infrared rays, but light of a wavelength that is blocked through the filter is not limited to infrared rays.

The camera module according to the present disclosure may include one or more of the imaging lens systems according to the aspects described above. As an example, the camera module may include an imaging lens system according to one aspect. As another example, the camera module may include both an imaging lens system according to one aspect and an imaging lens system according to another aspect.

The camera module according to one form may be configured to be variable in size. In detail, a distance CL from the forwardmost point of the camera module (e.g., the object-side surface of the first lens) to the image sensor may vary according to an operating state of the camera module. For example, CL in the operating state of the camera module may be greater than CL in a non-operating state of the camera module.

A camera module according to another aspect may include an imaging lens system that enables a change in size of the camera module. For example, the camera module may include an imaging lens system including first to eighth lenses sequentially arranged from the object-side surface. In addition, the camera module may include an image sensor configured to convert an optical signal incident in the imaging lens system into an electrical signal.

The camera module may be configured to move the imaging lens system toward the image sensor. For example, the camera module may move the imaging lens system toward the image sensor for focus adjustment or focus magnification adjustment, as well as move the imaging lens system toward the image sensor side to reduce the size of the camera module. A movement displacement of the imaging lens system according to the latter may be greater than a movement displacement of the imaging lens system according to the former. To elaborate, the movement displacement of the imaging lens system according to the latter may be expressed by the following conditional expression.

$$0.6 < (BFLx - BFLm)/BFLx < 0.8$$

In the above conditional expression, BFLx may be a distance from an image-side surface of the rearmost lens (an eighth lens in the case of an imaging lens system including eight lenses, and a sixth lens in the case of an imaging lens system including six lenses) in a state in which the imaging lens system is located farthest from the image sensor, and BFLm is a distance from the image-side surface of the rearmost lens to the image sensor in a state in which the imaging lens system is located closest to the image sensor.

For reference, in the above, it is described that the imaging lens system constituting the camera module includes eight lenses, but the number of lenses constituting the imaging lens system is not limited to eight lenses. For example, the camera module according to an example embodiment may include an imaging lens system constituting six or seven lenses.

A camera module according to another form may satisfy the conditional expression $0.6 < (BFLx - BFLm)/BFLx < 0.8$ described above to facilitate mounting in a thinned form and further satisfy other conditions for realization of high resolution. For example, the camera module may include an image sensor having a significant size to facilitate implementation of high resolution. In detail, an image height (a height of the imaging surface) that may be substantially formed in the image sensor may be 5.0 mm to 9.0 mm.

Hereinafter, an example of the camera module is described with reference to FIGS. 1 to 5.

The camera module 20 according to an example embodiment may be mounted on a portable terminal 1000 as illustrated in FIG. 1. In detail, the camera module 20 according to the present example embodiment may be mounted on one surface of the portable terminal 1000 together with another type of camera module 10. However, a target on which the camera module 20 may be mounted is not limited to a portable terminal.

Figure 2:
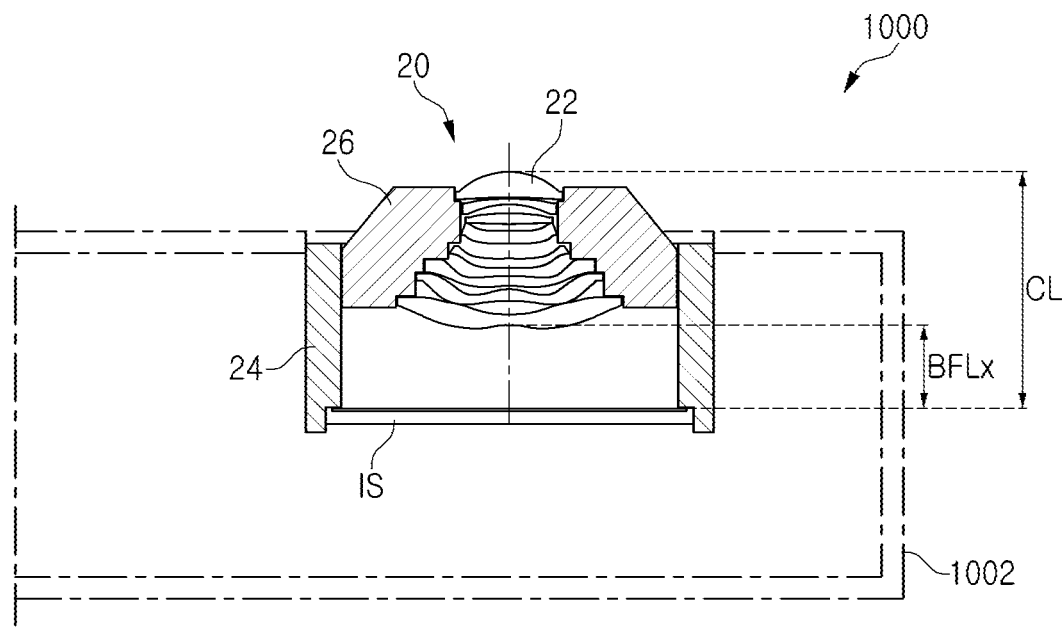
FIGS. 2 and 3 are cross-sectional views of the portable terminal illustrated in FIG. 1.
Figure 3:
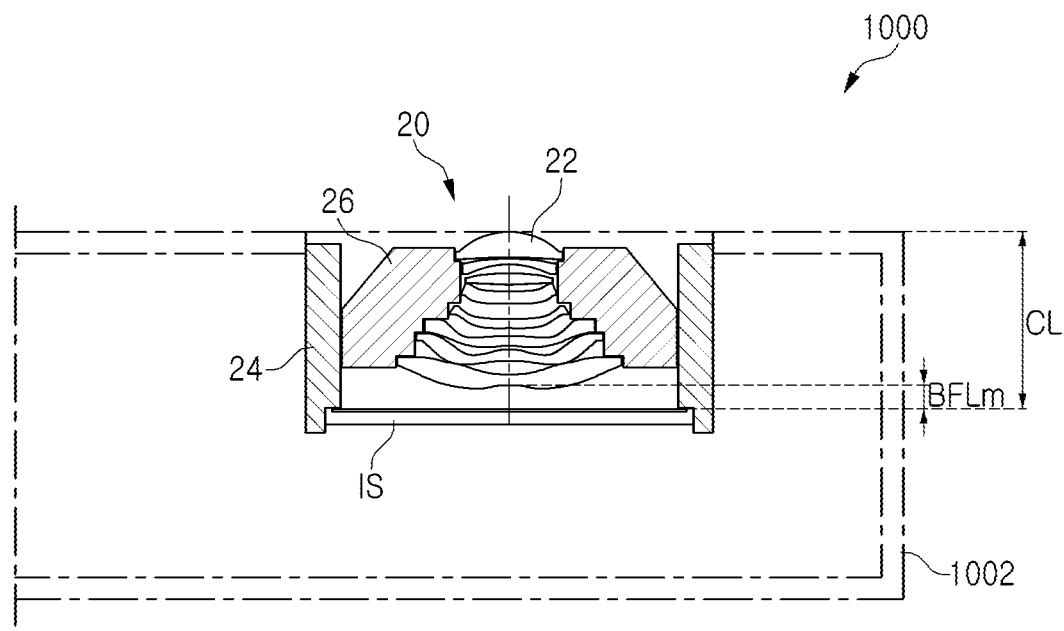

The portable terminal 1000 may include a housing 1002. The camera module 20 according to an example embodiment may be mounted in the housing 1002 of the portable terminal 1000 (FIG. 2 and FIG. 3).

The camera module 20 according to an example embodiment may be configured to implement a predetermined angle of view. For example, the angle of view of the camera module 20 may be wider than that of the other camera modules 10. In detail, the camera module 20 according to an example embodiment may be configured to capture an image of a subject located in a short distance, while having a higher resolution than that of the camera module 10.

The camera module 20 may include an imaging lens system 22, a first barrel 24, a second barrel 26, and an image sensor IS. However, the configuration of the camera module 20 is not limited to the components described above. For example, the camera module 20 may further include a driving unit for driving the first barrel 26.

The camera module 20 may be configured such that the length CL in the optical axis direction is variable. For example, the length of the camera module 20 in the optical axis direction may be reduced from a state illustrated in FIG. 2 to a state illustrated in FIG. 3. Conversely, the length of the camera module 20 in the optical axis direction may be extended from the state illustrated in FIG. 3 to the state illustrated in FIG. 2. The variable length of the camera module 20 in the optical axis direction may be generally proportional to the distance from the rearmost lens to the image sensor IS. In detail, a difference (BFLx−BFLm) between the distance BFLx from the rearmost lens in an operating state (or image capturing state) of the camera module to the image sensor IS and the distance BFLm from the rearmost lens in the non-operating state of the camera module 20 to the image sensor IS may have the following numerical relationship with respect to a rear focal length of the imaging lens system 22 or the distance BFLx from the rearmost lens in the operating state (or image capturing state) of the camera module 20 to the image sensor IS.

$$0.6 < (BFLx - BFLm)/BFLx < 0.8$$

The camera module 20 may include the imaging lens system 22. For example, the camera module 20 may include the imaging lens system 22 including eight lenses. However, a configuration of the imaging lens system 22 is not limited to eight lenses. For example, the imaging lens system 22 may include six or seven lenses.

Figure 4:
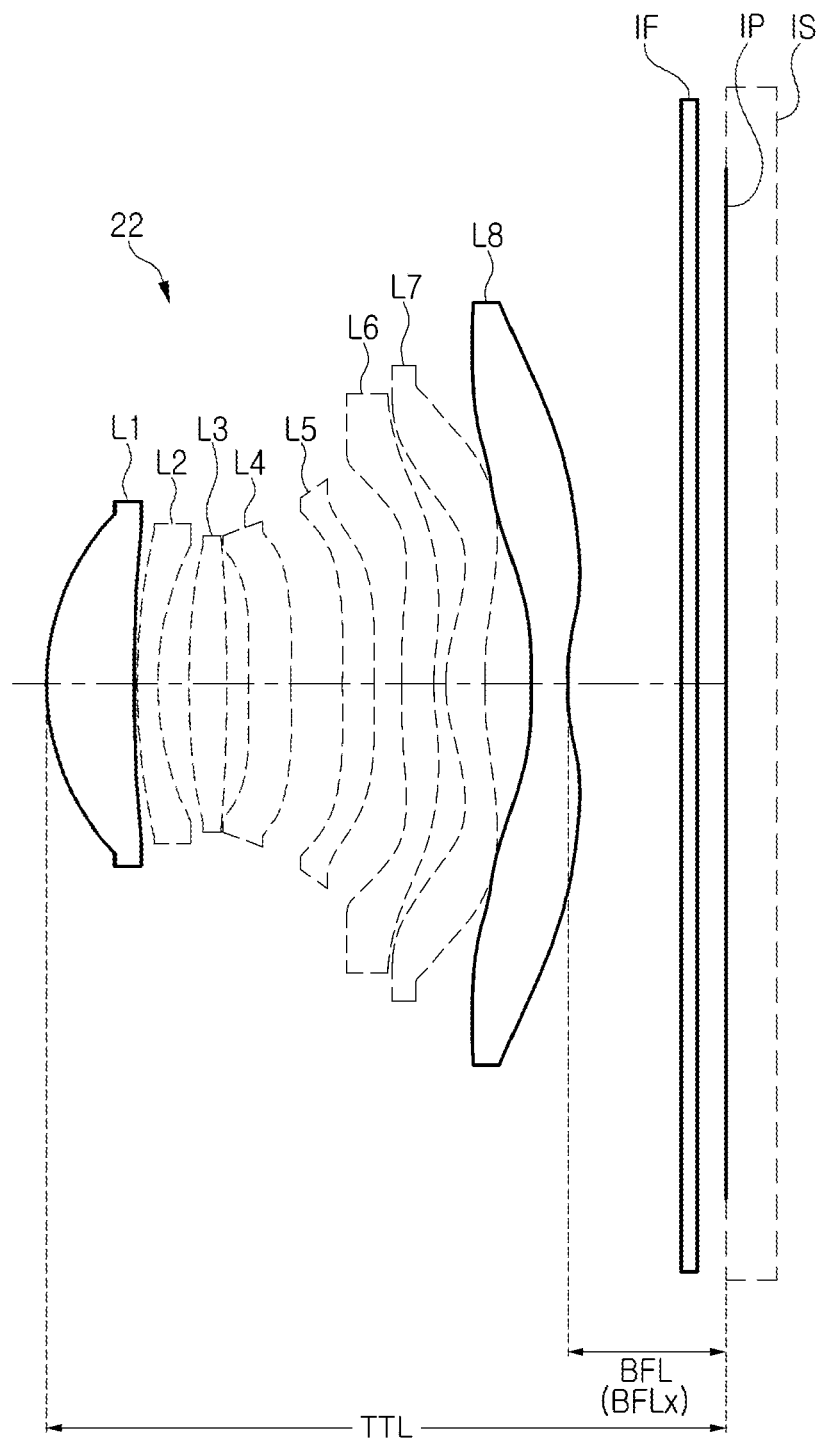
FIGS. 4 and 5 are enlarged views of the imaging lens system illustrated in FIGS. 2 and 3.
Figure 5:
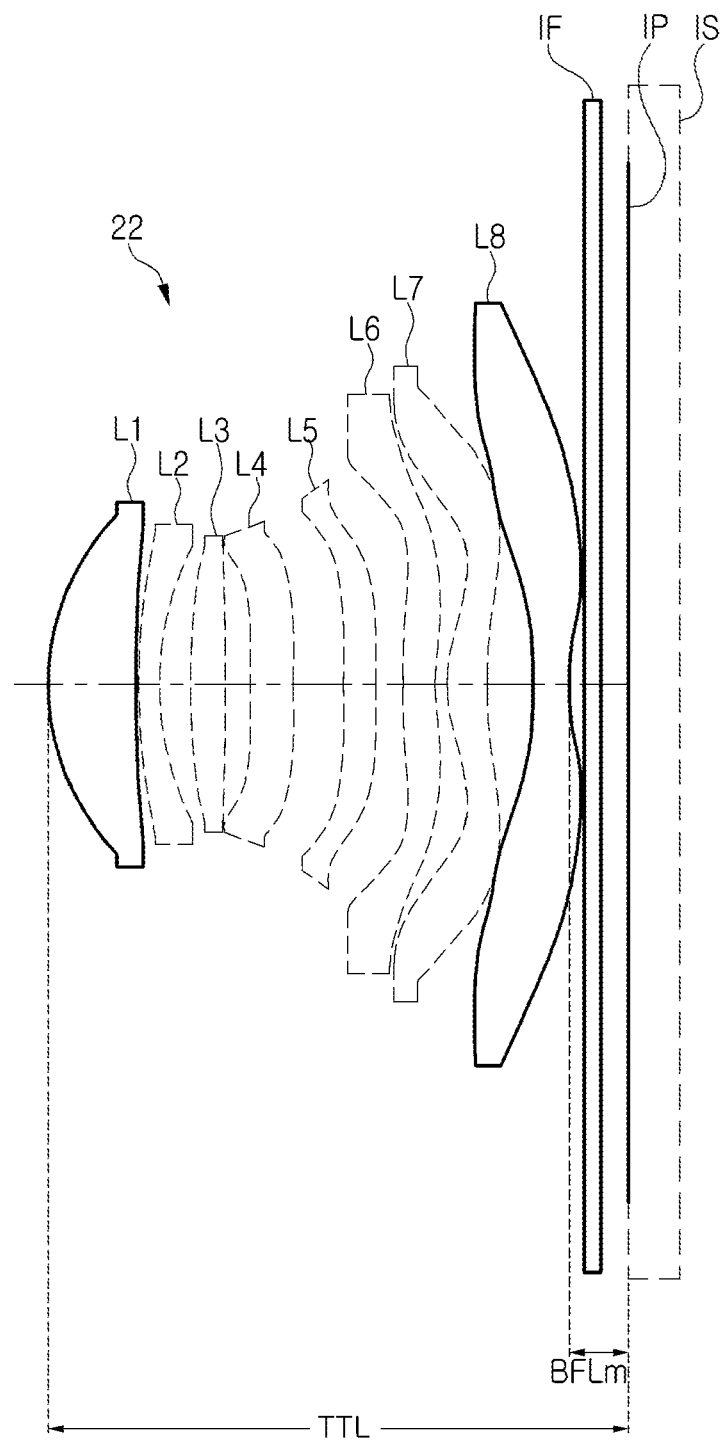

As illustrated in FIGS. 4 and 5, the imaging lens system 22 may include a first lens L1, a second lens L2, a third lens L3, a fourth lens L4, a fifth lens L5, a sixth lens L6, a seventh lens L7, and an eighth lens L8. However, the configuration of the imaging lens system 22 is not limited to the eight lenses. For example, the imaging lens system 22 may include lenses less than eight lenses. As an example, the imaging lens system 22 may include six lenses. In addition, the imaging lens system 22 may further include a filter IF.

The first lens L1 to the eighth lens L8 may be sequentially disposed in the optical axis direction. For example, the second lens L2 may be disposed on the image-side surface of the first lens L1, and the third lens L3 may be disposed on the image-side surface of the second lens L2. Therefore, in the imaging lens system 22 according to the present example embodiment, no optical element other than the filter IF or the image sensor IS is disposed on the image-side surface of the eighth lens L8, which is the rearmost lens. The first lens L1 to the eighth lens L8 are configured to image incident light in a certain position. For example, light refracted by the first lens L1 to the eighth lens L8 may be imaged on the imaging plane IP formed in the image sensor IS.

The imaging lens system 22 may be configured to have a sufficient space to be moved in the optical axis direction. In detail, the imaging lens system 22 may be configured to have a substantial rear focal length (i.e., the distance from the image-side surface of the eighth lens L8 to the imaging plane IP: BFL). For example, the BFL of the imaging lens system 22 may be greater than 1.9 mm and less than 2.8 mm. The BFL of the imaging lens system 22 may be increased or decreased in proportion to the length of the imaging lens system 22. For example, a ratio (BFL/TTL) between the BFL of the imaging lens system 22 and the length (TTL: the distance from the object-side surface of the first lens L1 to the imaging plane IP) of the imaging lens system 22 may be greater than 0.15.

The BFL of the imaging lens system 22 may be utilized as a space for avoiding the first lens L1 to the eighth lens L8 in a direction of the imaging plane IP. For example, the first lens L1 to the eighth lens L8 may move in the direction toward imaging plane IP with a size corresponding to the BFL. For reference, the BFL of the imaging lens system 22 may be substantially the same size as the BFLx of the camera module 20. However, the BFL and the BFLx are not necessarily formed to have the same size. For example, when the imaging plane IP is formed inside the image sensor IS, the BFL may be larger than the BFLx.

The imaging lens system 22 may be configured to realize high resolution. For example, the imaging lens system 22 may be configured to form the imaging plane IP having a fairly large size. For example, an image height of the imaging plane IP may be 5.0 mm to 9.0 mm.

The length of the camera module 20 may be varied through a plurality of barrels 24 and 26. For example, the length CL of the camera module 20 may be varied by driving the second barrel 26 accommodated in the first barrel 24 in the optical axis direction.

The first barrel 24 may be configured to receive the second barrel 26 and the image sensor IS. In addition, the first barrel 24 may further accommodate a driving unit necessary for driving the second barrel 26. However, the components accommodated in the first barrel 24 are not limited to the second barrel 26, the image sensor IS, and the driving unit.

The second barrel 26 may be disposed in the first barrel 24 and may be configured to accommodate the imaging lens system 22. The second barrel 26 may be configured to move in the optical axis direction. For example, the second barrel 26 may move toward an object or toward the image sensor IS, in a state of accommodating the imaging lens system 22. The second barrel 26 may be partially carried out from the first barrel 24 or completely carried in the interior of the first barrel 24 according to a moving direction. For example, the second barrel 26 may be carried out to the outside of the first barrel 24 as it moves toward the object, and may be carried in the interior of the first barrel 24 as it moves toward the image sensor IS.

The driving unit (not shown) may be configured to move the second barrel 26 in the optical axis direction. For example, the driving unit may move the second barrel 26 in the optical axis direction through a driving magnet and a driving coil. However, the components of the driving unit are not limited to the driving magnet and the driving coil.

The camera module 20 configured as described above may capture an image with high resolution. For example, the camera module 20 may enable the use of the large image sensor IS by forming a sufficient distance and space between the imaging lens system 22 and the image sensor IS. In addition, the camera module 20 may be configured to facilitate thinning. For example, the size of the camera module 20 may be reduced by varying the length CL in the optical axis direction as described above. Therefore, the camera module 20 according to the present example embodiment may be easily mounted in a small and thin electronic device.

Hereinafter, specific example embodiments of an imaging lens system capable of making the camera module thinner are described with reference to the drawings.

Figure 6:
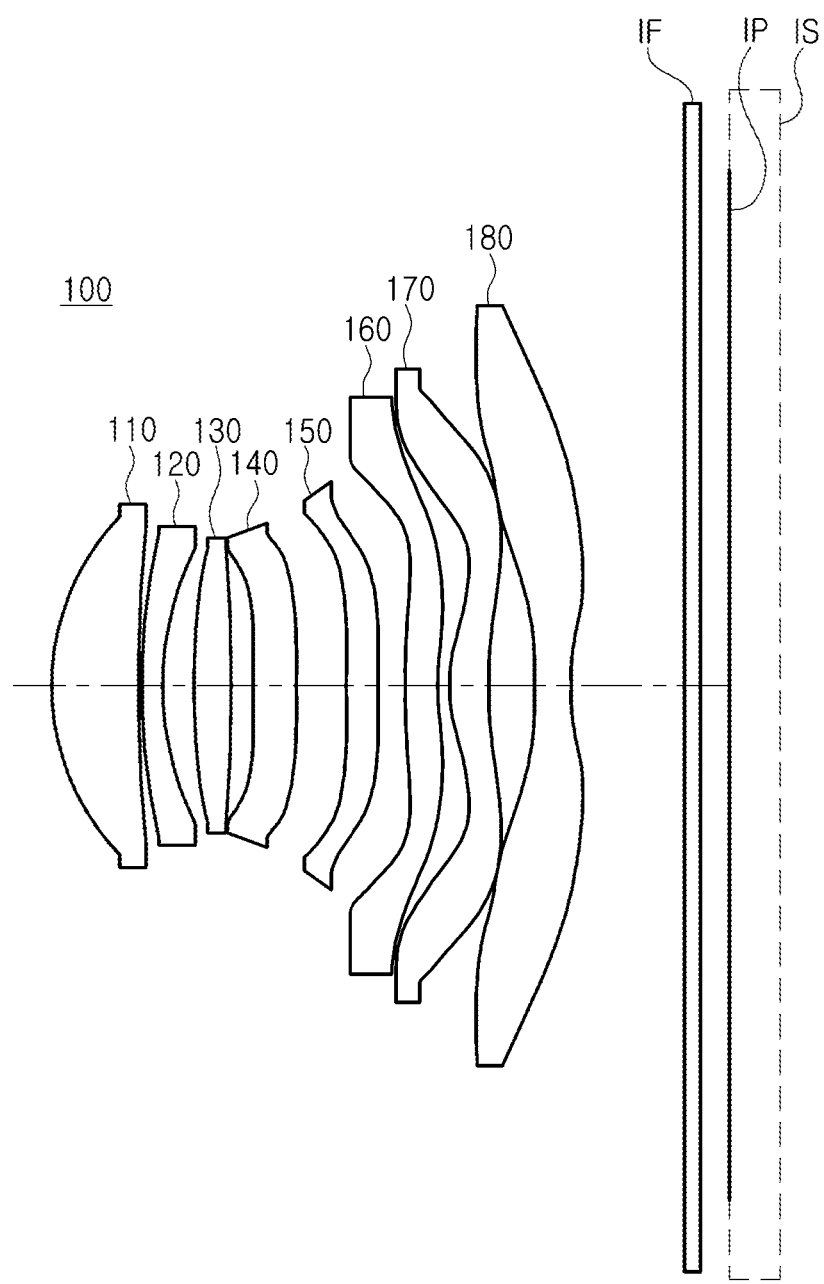
FIG. 6 is a configuration diagram of an imaging lens system according to a first example embodiment.

First, an imaging lens system according to a first example embodiment is described with reference to FIG. 6.

An imaging lens system 100 includes a first lens 110, a second lens 120, a third lens 130, a fourth lens 140, a fifth lens 150, a sixth lens 160, a seventh lens 170, and an eighth lens 180.

The first lens 110 has positive refractive power and has a convex object-side surface and a concave image-side surface. The second lens 120 has a negative refractive power and has a convex object-side surface and a concave image-side surface. The third lens 130 has positive refractive power and has a convex object-side surface and a concave image-side surface. The fourth lens 140 has a negative refractive power and has a convex object-side surface and a concave image-side surface. The fifth lens 150 has positive refractive power and has a concave object-side surface and a convex image-side surface. The sixth lens 160 has a negative refractive power and has a convex object-side surface and a concave image-side surface. In addition, an inflection point is formed on the object-side surface and the image-side surface of the sixth lens 160. The seventh lens 170 has positive refractive power and has a convex object-side surface and a concave image-side surface. In addition, an inflection point is formed on the object-side surface and the image-side surface of the seventh lens 170. The eighth lens 180 has a negative refractive power and has a convex object-side surface and a concave image-side surface. In addition, an inflection point is formed on the object-side surface and the image-side surface of the eighth lens 180.

The imaging lens system 100 may further include a stop ST (not shown), a filter IF, and an imaging plane IP. For example, the stop ST may be disposed between the second lens 120 and the third lens 130 or between the third lens 130 and the fourth lens 140. The filter IF may be disposed between the eighth lens 180 and the imaging plane IP. For reference, the stop ST and the filter IF may be omitted if necessary. The imaging plane IP may be formed in a position in which light incident from the first lens 110 to the eighth lens 180 is imaged. For example, the imaging plane IP may be formed on one surface of the image sensor IS of the camera module or inside the image sensor IS.

Figure 7:
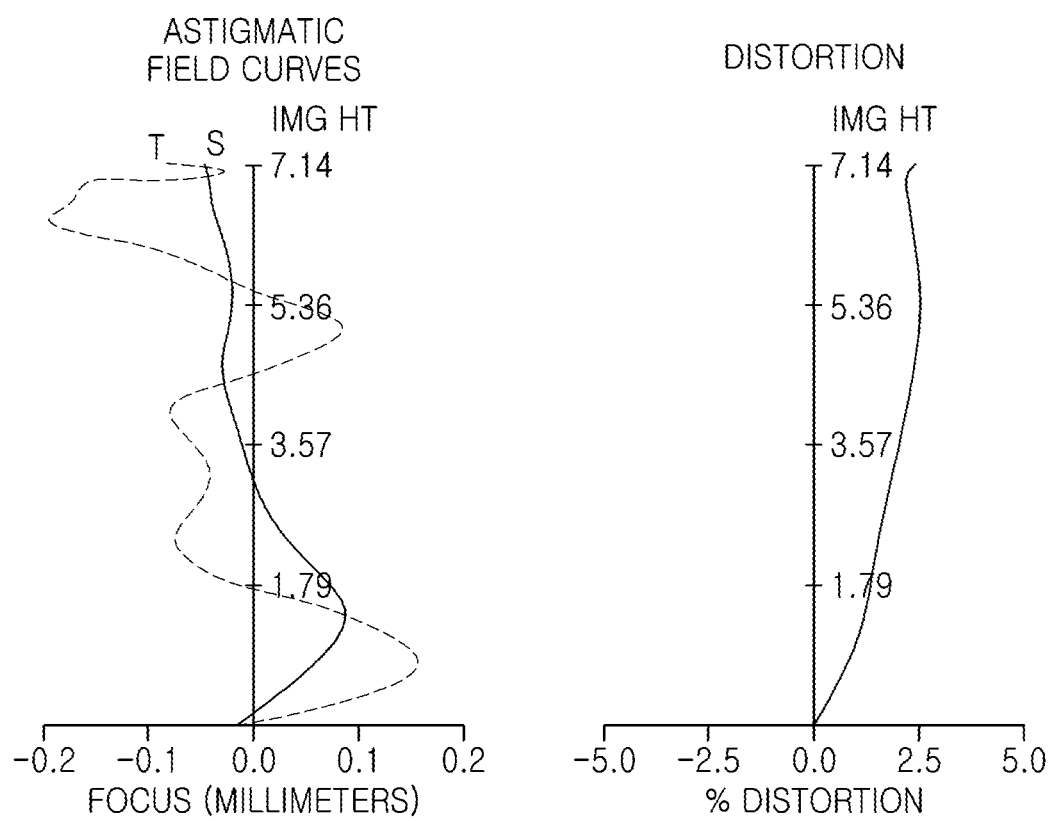
FIG. 7 is an aberration curve of the imaging lens system illustrated in FIG. 6.

The imaging lens system 100 configured as described above may exhibit aberration characteristics of the form illustrated in FIG. 7. Tables 1 and 2 show lens characteristics and aspheric values of the imaging lens system according to the present example embodiment.

TABLE 1

| Surface No. | Remark | Radius of curvature | Thickness/ distance | Refractive index | Abbe number |
| --- | --- | --- | --- | --- | --- |
| S1 | First lens | 3.234 | 1.202 | 1.546 | 56.0 |
| S2 |  | 26.650 | 0.040 |  |  |
| S3 | Second lens | 9.269 | 0.285 | 1.644 | 23.5 |
| S4 |  | 4.164 | 0.451 |  |  |
| S5 | Third lens | 13.849 | 0.505 | 1.537 | 55.7 |
| S6 |  | 94.750 | 0.331 |  |  |
| S7 | Fourth lens | 418.688 | 0.564 | 1.644 | 23.5 |
| S8 |  | 98.526 | 0.737 |  |  |
| S9 | Fifth lens | −33.561 | 0.431 | 1.546 | 56.0 |
| S10 |  | −26.310 | 0.385 |  |  |
| S11 | Sixth lens | 14.163 | 0.452 | 1.570 | 37.4 |
| S12 |  | 4.607 | 0.174 |  |  |
| S13 | Seventh lens | 2.377 | 0.550 | 1.546 | 56.0 |
| S14 |  | 21.284 | 0.604 |  |  |
| S15 | Eighth lens | 39.157 | 0.520 | 1.537 | 55.7 |
| S16 |  | 2.755 | 1.583 |  |  |
| S17 | Filter |  | 0.210 | 1.518 | 64.2 |
| S18 |  |  | 0.375 |  |  |
| S19 | Imaging plane |  | 0.015 |  |  |

TABLE 2

| Surface No. | S1 | S2 | S3 | S4 | S5 | S6 | S7 | S8 |
|---|---|---|---|---|---|---|---|---|
| K | −1.14.E+00 | 9.54.E+01 | 9.96.E+00 | 7.11.E−01 | 4.69.E+01 | 9.50.E+01 | 6.57.E+01 | −7.31.E+01 |
| A | 6.96.E−03 | −2.82.E−02 | −3.42.E−02 | −1.06.E−02 | 2.13.E−02 | −2.90.E−03 | −3.10.E−02 | 2.42.E−03 |
| B | −8.61.E−03 | 1.39.E−01 | 1.41.E−01 | 3.64.E−02 | −1.16.E−01 | 1.77.E−02 | 1.09.E−01 | −6.27.E−02 |
| C | 1.38.E−02 | −3.53.E−01 | −3.80.E−01 | −1.43.E−01 | 3.57.E−01 | −1.33.E−01 | −4.37.E−01 | 1.60.E−01 |
| D | −1.33.E−02 | 5.46.E−01 | 6.16.E−01 | 3.14.E−01 | −7.22.E−01 | 4.12.E−01 | 1.06.E+00 | −2.73.E−01 |
| E | 8.44.E−03 | −5.66.E−01 | −6.65.E−01 | −4.59.E−01 | 9.87.E−01 | −7.84.E−01 | −1.72.E+00 | 3.14.E−01 |
| F | −3.69.E−03 | 4.13.E−01 | 5.05.E−01 | 4.71.E−01 | −9.47.E−01 | 9.96.E−01 | 1.95.E+00 | −2.54.E−01 |
| G | 1.15.E−03 | −2.18.E−01 | −2.78.E−01 | −3.48.E−01 | 6.53.E−01 | −8.81.E−01 | −1.58.E+00 | 1.47.E−01 |
| H | −2.58.E−04 | 8.40.E−02 | 1.11.E−01 | 1.87.E−01 | −3.29.E−01 | 5.53.E−01 | 9.27.E−01 | −6.19.E−02 |
| J | 4.20.E−05 | −2.37.E−02 | −3.27.E−02 | −7.30.E−02 | 1.21.E−01 | −2.48.E−01 | −3.94.E−01 | 1.90.E−02 |

| Surface No. | S9 | S10 | S11 | S12 | S13 | S14 | S15 | S16 |
|---|---|---|---|---|---|---|---|---|
| K | −6.86.E+01 | 7.01.E+01 | 1.81.E+01 | −2.79.E+01 | −1.10.E+01 | 1.65.E+01 | 5.11.E+01 | −1.01.E+01 |
| A | 4.57.E−04 | 1.80.E−02 | 7.06.E−03 | −5.37.E−02 | 4.11.E−02 | 5.53.E−02 | −8.35.E−02 | −5.15.E−02 |
| B | 1.10.E−02 | −2.38.E−02 | 3.08.E−03 | 2.03.E−02 | −6.25.E−02 | −4.40.E−02 | 2.99.E−02 | 2.01.E−02 |
| C | −5.81.E−02 | −7.44.E−03 | −1.42.E−02 | −2.89.E−04 | 4.57.E−02 | 2.34.E−02 | −7.42.E−03 | −5.86.E−03 |
| D | 9.56.E−02 | 3.15.E−02 | 1.31.E−02 | −4.99.E−03 | −2.38.E−02 | −9.87.E−03 | 1.81.E−03 | 1.29.E−03 |
| E | −9.51.E−02 | −3.49.E−02 | −7.60.E−03 | 3.22.E−03 | 8.49.E−03 | 3.08.E−03 | −3.94.E−04 | −2.18.E−04 |
| F | 6.47.E−02 | 2.39.E−02 | 3.10.E−03 | −1.13.E−03 | −2.12.E−03 | −6.95.E−04 | 6.36.E−05 | 2.78.E−05 |
| G | −3.15.E−02 | −1.13.E−02 | −9.26.E−04 | 2.56.E−04 | 3.77.E−04 | 1.14.E−04 | −7.24.E−06 | −2.66.E−06 |
| H | 1.12.E−02 | 3.81.E−03 | 2.04.E−04 | −3.96.E−05 | −4.86.E−05 | −1.36.E−05 | 5.83.E−07 | 1.88.E−07 |
| J | −2.91.E−03 | −9.18.E−04 | −3.31.E−05 | 4.27.E−06 | 4.53.E−06 | 1.19.E−06 | −3.33.E−08 | −9.79.E−09 |

Figure 8:
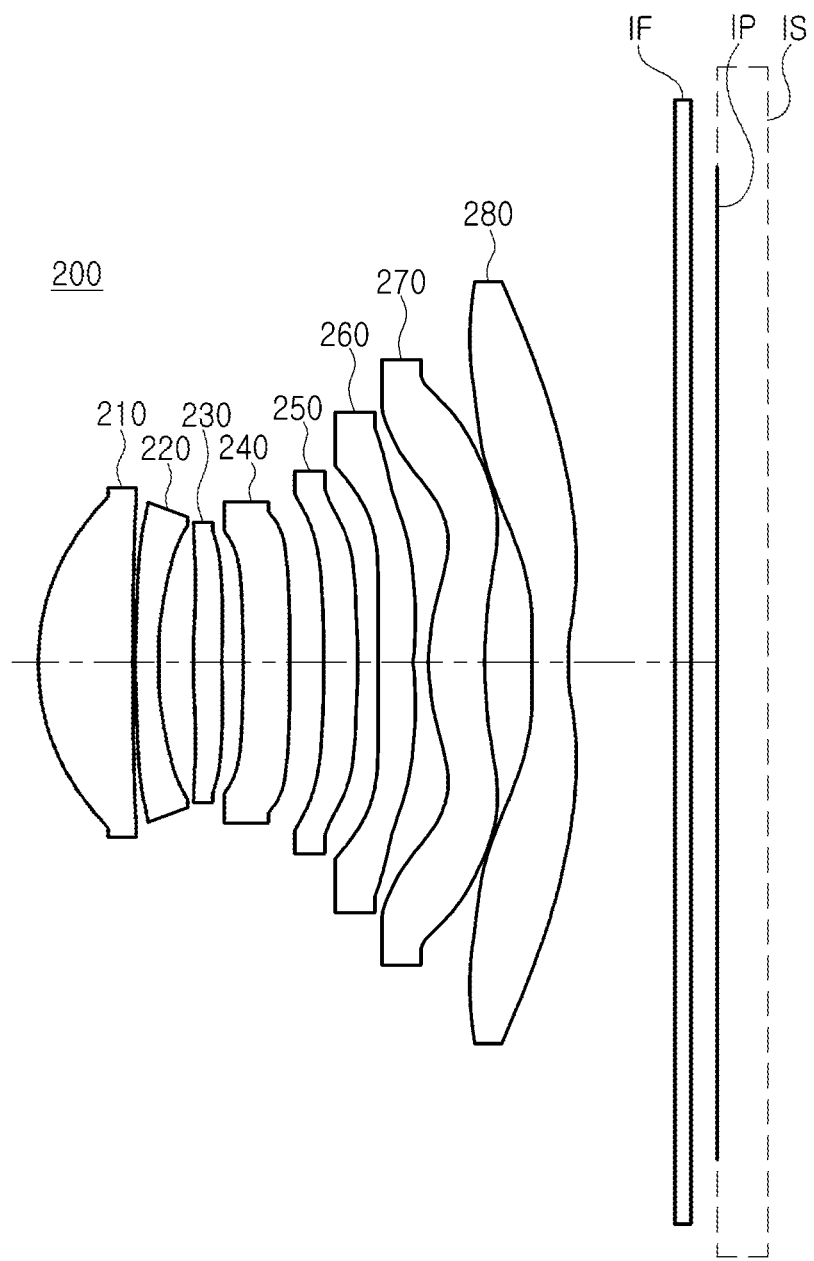
FIG. 8 is a configuration diagram of an imaging lens system according to a second example embodiment.

An imaging lens system according to a second example embodiment is described with reference to FIG. 8.

An imaging lens system 200 includes a first lens 210, a second lens 220, a third lens 230, a fourth lens 240, a fifth lens 250, a sixth lens 260, a seventh lens 270, and an eighth lens 280.

The first lens 210 has positive refractive power and has a convex object-side surface and a concave image-side surface. The second lens 220 has a negative refractive power and has a convex object-side surface and a concave image-side surface. The third lens 230 has positive refractive power and has a convex object-side surface and a concave image-side surface. The fourth lens 240 has a negative refractive power and has a convex object-side surface and a concave image-side surface. The fifth lens 250 has positive refractive power and has a concave object-side surface and a convex image-side surface. The sixth lens 260 has a negative refractive power and has a convex object-side surface and a concave image-side surface. In addition, an inflection point is formed on the object-side surface and the image-side surface of the sixth lens 260. The seventh lens 270 has positive refractive power and has a convex object-side surface and a concave image-side surface. In addition, an inflection point is formed on the object-side surface and the image-side surface of the seventh lens 270. The eighth lens 280 has a negative refractive power and has a concave object-side surface and a concave image-side surface. In addition, an inflection point is formed on the object-side surface and the image-side surface of the eighth lens 280.

The imaging lens system 200 may further include a stop ST (not shown), a filter IF, and an imaging plane IP. For example, the stop ST may be disposed between the second lens 220 and the third lens 230 or between the third lens 230 and the fourth lens 240. The filter IF may be disposed between the eighth lens 280 and the imaging plane IP. For reference, the stop ST and the filter IF may be omitted if necessary. The imaging plane IP may be formed in a position in which light incident from the first lens 210 to the eighth lens 280 is imaged. For example, the imaging plane IP may be formed on one surface of the image sensor IS of the camera module or inside the image sensor IS.

Figure 9:
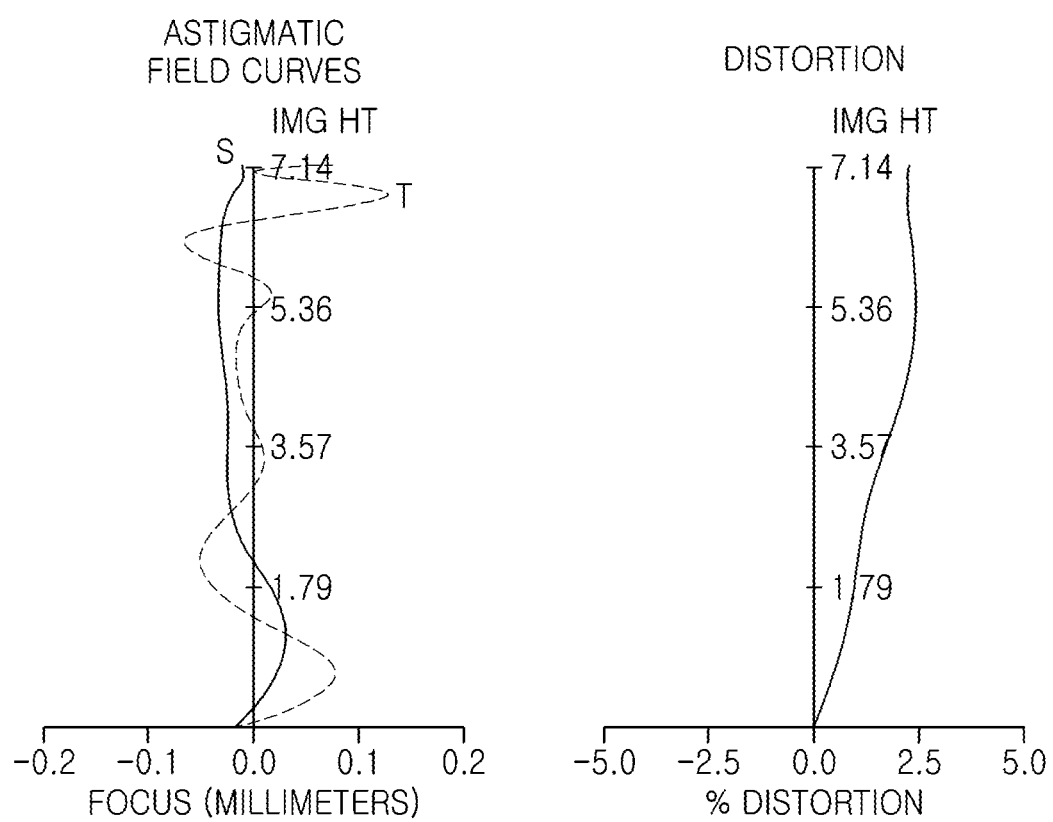
FIG. 9 is an aberration curve of the imaging lens system illustrated in FIG. 8.

The imaging lens system 200 configured as described above may exhibit aberration characteristics of the form illustrated in FIG. 9. Tables 3 and 4 show lens characteristics and aspheric values of the imaging lens system according to the present example embodiment.

TABLE 3

| Surface No. | Remark | Radius of curvature | Thickness/ distance | Refractive index | Abbe number |
|---|---|---|---|---|---|
| S1 | First lens | 3.272 | 1.384 | 1.546 | 56.0 |
| S2 |  | 31.991 | 0.040 |  |  |
| S3 | Second lens | 13.662 | 0.320 | 1.640 | 24.0 |
| S4 |  | 5.116 | 0.503 |  |  |
| S5 | Third lens | 15.962 | 0.429 | 1.546 | 56.0 |
| S6 |  | 38.028 | 0.282 |  |  |
| S7 | Fourth lens | 97.020 | 0.665 | 1.619 | 25.9 |
| S8 |  | 54.421 | 0.507 |  |  |
| S9 | Fifth lens | −32.107 | 0.505 | 1.546 | 56.0 |
| S10 |  | −26.876 | 0.312 |  |  |
| S11 | Sixth lens | 35.562 | 0.504 | 1.570 | 37.4 |
| S12 |  | 4.330 | 0.221 |  |  |
| S13 | Seventh lens | 2.186 | 0.825 | 1.546 | 56.0 |
| S14 |  | 18.397 | 0.661 |  |  |
| S15 | Eighth lens | −38.991 | 0.520 | 1.537 | 55.7 |
| S16 |  | 3.608 | 1.550 |  |  |
| S17 | Filter |  | 0.210 | 1.518 | 64.2 |
| S18 |  |  | 0.375 |  |  |
| S19 | Imaging plane |  | 0.015 |  |  |

TABLE 4

| Surface No. | S1 | S2 | S3 | S4 | S5 | S6 | S7 | S8 |
|---|---|---|---|---|---|---|---|---|
| K | −1.02.E+00 | 7.01.E+01 | 1.47.E+01 | 1.56.E+00 | 4.76.E+01 | 9.50.E+01 | 6.57.E+01 | 6.94.E+01 |
| A | 7.79.E−03 | −3.36.E−02 | −3.70.E−02 | −4.33.E−03 | −4.02.E−03 | −9.50.E−03 | −1.59.E−02 | 3.49.E−03 |
| B | −1.53.E−02 | 7.58.E−02 | 6.63.E−02 | −3.16.E−02 | −1.19.E−02 | 8.50.E−03 | 4.13.E−02 | −5.58.E−02 |
| C | 3.37.E−02 | −1.26.E−01 | −9.46.E−02 | 1.45.E−01 | 3.01.E−02 | −5.43.E−02 | −2.02.E−01 | 1.58.E−01 |
| D | −4.64.E−02 | 1.51.E−01 | 8.90.E−02 | −3.67.E−01 | −8.70.E−02 | 1.20.E−01 | 5.23.E−01 | −2.90.E−01 |
| E | 4.30.E−02 | −1.31.E−01 | −4.88.E−02 | 5.96.E−01 | 1.74.E−01 | −1.68.E−01 | −8.70.E−01 | 3.56.E−01 |
| F | −2.80.E−02 | 8.33.E−02 | 8.10.E−03 | −6.62.E−01 | −2.33.E−01 | 1.62.E−01 | 9.92.E−01 | −3.03.E−01 |
| G | 1.31.E−02 | −3.95.E−02 | 9.63.E−03 | 5.20.E−01 | 2.15.E−01 | −1.13.E−01 | −8.01.E−01 | 1.84.E−01 |
| H | −4.46.E−03 | 1.39.E−02 | −9.16.E−03 | −2.94.E−01 | −1.39.E−01 | 5.83.E−02 | 4.65.E−01 | −8.07.E−02 |
| J | 1.10.E−03 | −3.62.E−03 | 4.19.E−03 | 1.20.E−01 | 6.42.E−02 | −2.21.E−02 | −1.95.E−01 | 2.56.E−02 |

| Surface No. | S9 | S10 | S11 | S12 | S13 | S14 | S15 | S16 |
|---|---|---|---|---|---|---|---|---|
| K | −5.88.E+01 | 7.01.E+01 | 1.81.E+01 | −4.65.E+01 | −8.05.E+00 | 1.65.E+01 | 5.11.E+01 | −1.16.E+01 |
| A | −2.01.E−03 | −6.52.E−03 | −7.02.E−02 | −1.21.E−01 | −9.46.E−03 | 6.02.E−02 | −3.68.E−02 | −3.64.E−02 |
| B | 1.19.E−02 | 2.36.E−02 | 1.13.E−01 | 8.79.E−02 | −1.03.E−02 | −4.69.E−02 | 3.37.E−03 | 8.87.E−03 |
| C | −3.96.E−02 | −3.36.E−02 | −1.18.E−01 | −4.60.E−02 | 7.89.E−03 | 2.07.E−02 | 1.82.E−03 | −1.52.E−03 |
| D | 5.48.E−02 | 2.36.E−02 | 9.48.E−02 | 1.83.E−02 | −4.08.E−03 | −6.64.E−03 | −6.97.E−04 | 1.96.E−04 |
| E | −4.93.E−02 | −1.21.E−02 | −6.05.E−02 | −5.52.E−03 | 1.49.E−03 | 1.61.E−03 | 1.23.E−04 | −2.19.E−05 |
| F | 3.09.E−02 | 5.39.E−03 | 2.99.E−02 | 1.21.E−03 | −4.03.E−04 | −2.98.E−04 | −1.33.E−05 | 2.52.E−06 |
| G | −1.38.E−02 | −2.12.E−03 | −1.11.E−02 | −1.86.E−04 | 8.12.E−05 | 4.26.E−05 | 9.28.E−07 | −2.81.E−07 |
| H | 4.32.E−03 | 6.78.E−04 | 3.09.E−03 | 1.98.E−05 | −1.23.E−05 | −4.69.E−06 | −4.12.E−08 | 2.51.E−08 |
| J | −9.46.E−04 | −1.64.E−04 | −6.28.E−04 | −1.45.E−06 | 1.39.E−06 | 3.93.E−07 | 1.02.E−09 | −1.62.E−09 |

Figure 10:
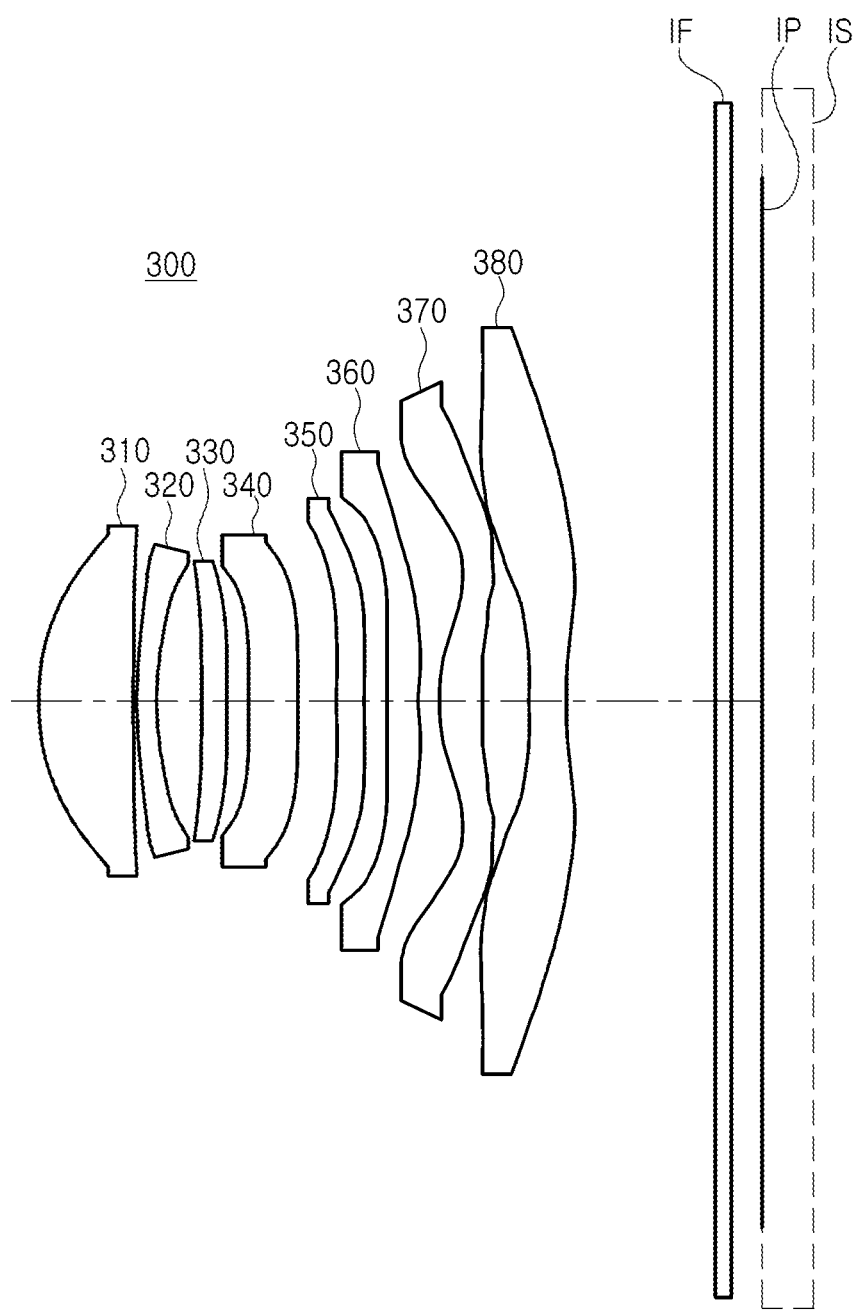
FIG. 10 is a configuration diagram of an imaging lens system according to a third example embodiment.

An imaging lens system according to a third example embodiment is described with reference to FIG. 10.

An imaging lens system 300 includes a first lens 310, a second lens 320, a third lens 330, a fourth lens 340, a fifth lens 350, a sixth lens 360, a seventh lens 370, and an eighth lens 380.

The first lens 310 has positive refractive power and has a convex object-side surface and a concave image-side surface. The second lens 320 has a negative refractive power and has a convex object-side surface and a concave image-side surface. The third lens 330 has positive refractive power and has a convex object-side surface and a convex image-side surface. The fourth lens 340 has a negative refractive power and has a concave object-side surface and a convex image-side surface. The fifth lens 350 has positive refractive power and has a concave object-side surface and a convex image-side surface. The sixth lens 360 has a negative refractive power and has a convex object-side surface and a concave image-side surface. In addition, an inflection point is formed on the object-side surface and the image-side surface of the sixth lens 360. The seventh lens 370 has positive refractive power and has a convex object-side surface and a concave image-side surface. In addition, an inflection point is formed on the object-side surface and the image-side surface of the seventh lens 370. The eighth lens 380 has a negative refractive power and has a concave object-side surface and a concave image-side surface. In addition, an inflection point is formed on the object-side surface and the image-side surface of the eighth lens 380.

The imaging lens system 300 may further include a stop ST (not shown), a filter IF, and an imaging plane IP. For example, the stop ST may be disposed between the second lens 320 and the third lens 330 or between the third lens 330 and the fourth lens 340. The filter IF may be disposed between the eighth lens 380 and the imaging plane IP. For reference, the stop ST and the filter IF may be omitted if necessary. The imaging plane IP may be formed in a position in which light incident from the first lens 310 to the eighth lens 380 is imaged. For example, the imaging plane IP may be formed on one surface of the image sensor IS of the camera module or inside the image sensor IS.

Figure 11:
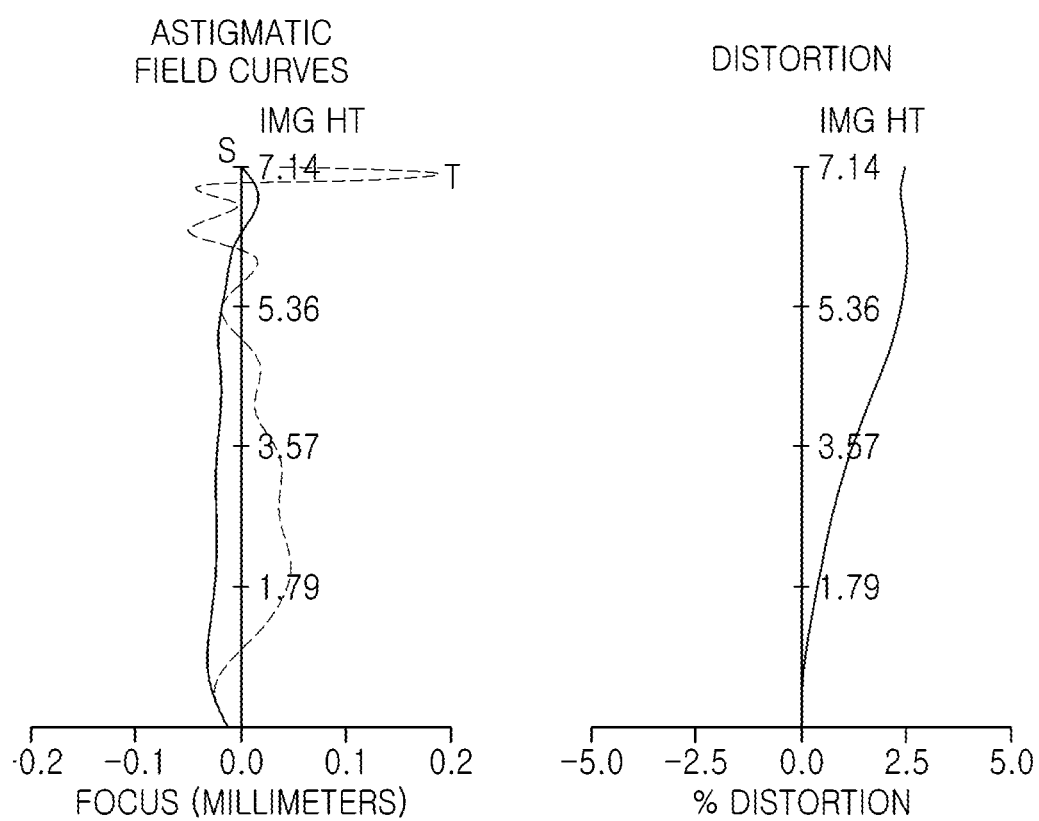
FIG. 11 is an aberration curve of the imaging lens system illustrated in FIG. 10.

The imaging lens system 300 configured as described above may exhibit aberration characteristics of the form illustrated in FIG. 11. Tables 5 and 6 show lens characteristics and aspheric values of the imaging lens system according to the present example embodiment.

TABLE 5

| Surface No. | Remark | Radius of curvature | Thickness/ distance | Refractive index | Abbe number |
|---|---|---|---|---|---|
| S1 | First lens | 3.097 | 1.288 | 1.546 | 56.0 |
| S2 | | 19.112 | 0.051 | | |
| S3 | Second lens | 9.490 | 0.262 | 1.667 | 20.4 |
| S4 | | 4.801 | 0.601 | | |
| S5 | Third lens | 282.791 | 0.357 | 1.546 | 56.0 |
| S6 | | −100.545 | 0.308 | | |
| S7 | Fourth lens | −22.449 | 0.668 | 1.644 | 23.5 |
| S8 | | −26.446 | 0.531 | | |
| S9 | Fifth lens | −49.355 | 0.360 | 1.546 | 56.0 |
| S10 | | −45.091 | 0.313 | | |
| S11 | Sixth lens | 23.391 | 0.435 | 1.570 | 37.4 |
| S12 | | 3.836 | 0.288 | | |
| S13 | Seventh lens | 1.971 | 0.574 | 1.546 | 56.0 |
| S14 | | 17.886 | 0.660 | | |
| S15 | Eighth lens | −35.693 | 0.481 | 1.546 | 56.0 |
| S16 | | 3.410 | 2.050 | | |
| S17 | Filter | | 0.210 | 1.518 | 64.2 |
| S18 | | | 0.385 | | |
| S19 | Imaging plane | | 0.005 | | |

TABLE 6

| Surface No. | S1 | S2 | S3 | S4 | S5 | S6 | S7 | S8 |
|---|---|---|---|---|---|---|---|---|
| K | −9.54.E−01 | 4.25.E+01 | 1.35.E+01 | 2.15.E+00 | 4.76.E+01 | 9.50.E+01 | 6.57.E+01 | 7.56.E+01 |
| A | 2.93.E−03 | −7.15.E−03 | −1.16.E−02 | −5.53.E−03 | −1.17.E−02 | −1.17.E−02 | −9.53.E−03 | −3.93.E−03 |
| B | 5.14.E−03 | 3.18.E−03 | 2.22.E−03 | −4.93.E−03 | 2.09.E−03 | −8.59.E−03 | 2.56.E−03 | −5.20.E−03 |
| C | −1.06.E−02 | −6.83.E−03 | −5.40.E−03 | 2.45.E−02 | −9.72.E−03 | 1.42.E−02 | −3.94.E−02 | −3.18.E−03 |
| D | 1.55.E−02 | 1.18.E−02 | 1.24.E−02 | −7.26.E−02 | 4.97.E−03 | −2.73.E−02 | 1.14.E−01 | 1.51.E−02 |
| E | −1.55.E−02 | −1.18.E−02 | −1.40.E−02 | 1.44.E−01 | 2.73.E−02 | 3.89.E−02 | −2.05.E−01 | −2.33.E−02 |
| F | 1.11.E−02 | 7.57.E−03 | 1.00.E−02 | −1.93.E−01 | −7.35.E−02 | −3.86.E−02 | 2.48.E−01 | 2.19.E−02 |
| G | −5.72.E−03 | −3.25.E−03 | −4.85.E−03 | 1.81.E−01 | 9.69.E−02 | 2.69.E−02 | −2.12.E−01 | −1.41.E−02 |
| H | 2.15.E−03 | 9.17.E−04 | 1.60.E−03 | −1.21.E−01 | −8.07.E−02 | −1.31.E−02 | 1.30.E−01 | 6.54.E−03 |
| J | −5.91.E−04 | −1.52.E−04 | −3.41.E−04 | 5.81.E−02 | 4.53.E−02 | 4.29.E−03 | −5.74.E−02 | −2.19.E−03 |

| Surface No. | S9 | S10 | S11 | S12 | S13 | S14 | S15 | S16 |
|---|---|---|---|---|---|---|---|---|
| K | 9.13.E+01 | 7.01.E+01 | 1.81.E+01 | −5.13.E+01 | −6.81.E+00 | 1.65.E+01 | 5.11.E+01 | −1.22.E+01 |
| A | 2.09.E−02 | 3.38.E−02 | −7.61.E−02 | −1.45.E−01 | −8.36.E−03 | 6.19.E−02 | −5.33.E−02 | −4.17.E−02 |
| B | −3.89.E−02 | −3.18.E−02 | 1.24.E−01 | 1.20.E−01 | −2.24.E−03 | −4.32.E−02 | 1.45.E−02 | 1.33.E−02 |
| C | 2.32.E−02 | 4.48.E−03 | −1.27.E−01 | −7.64.E−02 | −3.65.E−04 | 1.61.E−02 | −3.14.E−03 | −3.33.E−03 |
| D | −9.34.E−03 | 4.07.E−03 | 8.90.E−02 | 3.88.E−02 | 4.11.E−04 | −4.09.E−03 | 8.88.E−04 | 6.76.E−04 |
| E | 4.21.E−03 | −1.64.E−03 | −4.58.E−02 | −1.55.E−02 | −1.94.E−04 | 6.57.E−04 | −2.24.E−04 | −1.11.E−04 |
| F | −2.59.E−03 | −7.09.E−04 | 1.75.E−02 | 4.81.E−03 | 5.78.E−05 | −5.07.E−05 | 3.99.E−05 | 1.43.E−05 |
| G | 1.39.E−03 | 8.65.E−04 | −4.98.E−03 | −1.14.E−03 | −1.21.E−05 | −3.17.E−06 | −4.91.E−06 | −1.44.E−06 |
| H | −5.18.E−04 | −3.80.E−04 | 1.05.E−03 | 2.05.E−04 | 1.90.E−06 | 1.40.E−06 | 4.28.E−07 | 1.10.E−07 |
| J | 1.30.E−04 | 9.84.E−05 | −1.63.E−04 | −2.73.E−05 | −2.28.E−07 | −1.91.E−07 | −2.66.E−08 | −6.20.E−09 |

Figure 12:
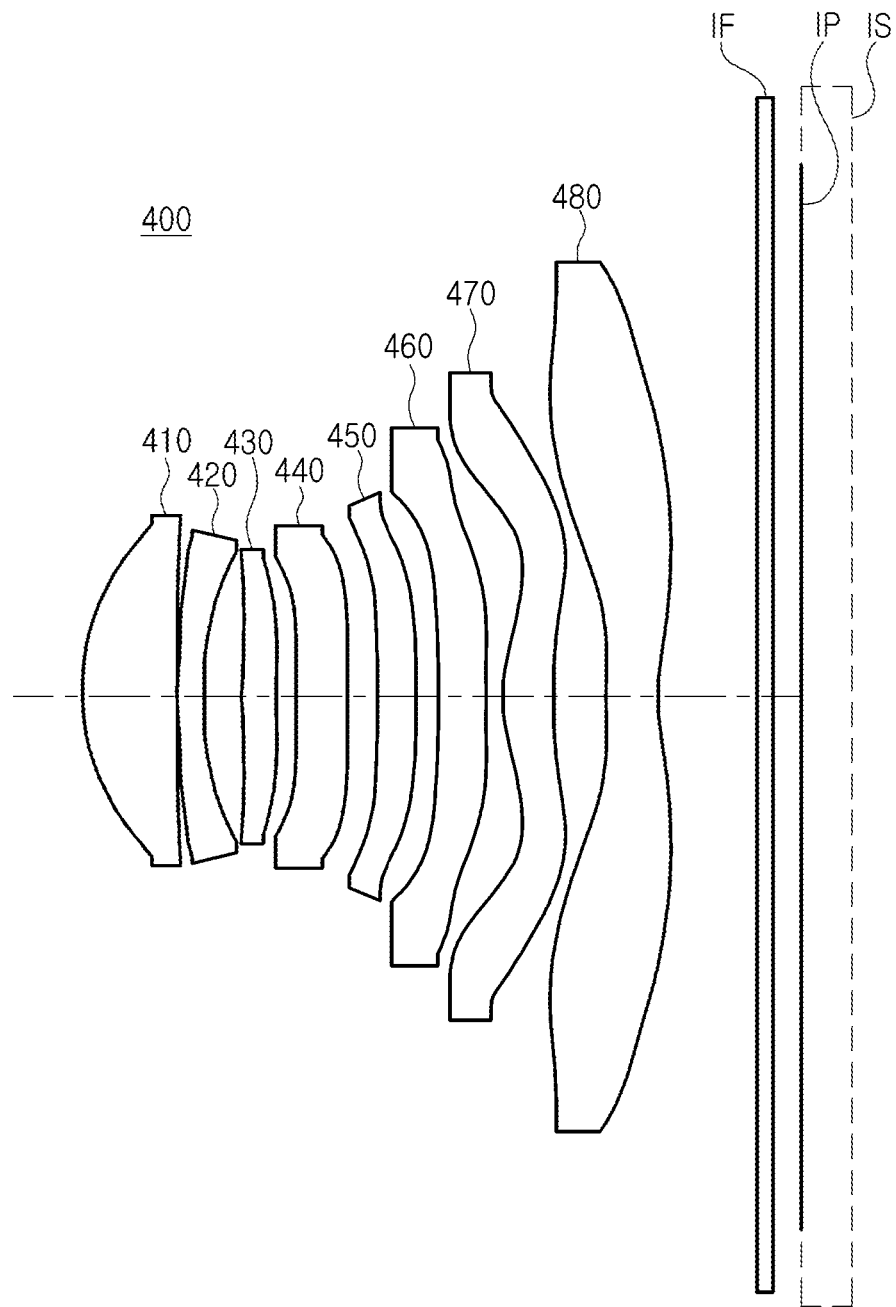
FIG. 12 is a configuration diagram of an imaging lens system according to a fourth example embodiment.

An imaging lens system according to a fourth example embodiment is described with reference to FIG. 12.

An imaging lens system 400 includes a first lens 410, a second lens 420, a third lens 430, a fourth lens 440, a fifth lens 450, a sixth lens 460, a seventh lens 470, and an eighth lens 480.

The first lens 410 has positive refractive power and has a convex object-side surface and a concave image-side surface. The second lens 420 has a negative refractive power and has a convex object-side surface and a concave image-side surface. The third lens 430 has positive refractive power and has a convex object-side surface and a concave image-side surface. The fourth lens 440 has a negative refractive power and has a concave object-side surface and a concave image-side surface. The fifth lens 450 has positive refractive power and has a concave object-side surface and a convex image-side surface. The sixth lens 460 has a negative refractive power and has a convex object-side surface and a concave image-side surface. In addition, an inflection point is formed on the object-side surface and the image-side surface of the sixth lens 460. The seventh lens 470 has positive refractive power and has a convex object-side surface and a concave image-side surface. In addition, an inflection point is formed on the object-side surface and the image-side surface of the seventh lens 470. The eighth lens 480 has a negative refractive power and has a concave object-side surface and a concave image-side surface. In addition, an inflection point is formed on the object-side surface and the image-side surface of the eighth lens 480.

The imaging lens system 400 may further include a stop ST (not shown), a filter IF, and an imaging plane IP. For example, the stop ST may be disposed between the second lens 420 and the third lens 430 or between the third lens 430 and the fourth lens 440. The filter IF may be disposed between the eighth lens 480 and the imaging plane IP. For reference, the stop ST and the filter IF may be omitted if necessary. The imaging plane IP may be formed in a position in which light incident from the first lens 410 to the eighth lens 480 is imaged. For example, the imaging plane IP may be formed on one surface of the image sensor IS of the camera module or inside the image sensor IS.

Figure 13:
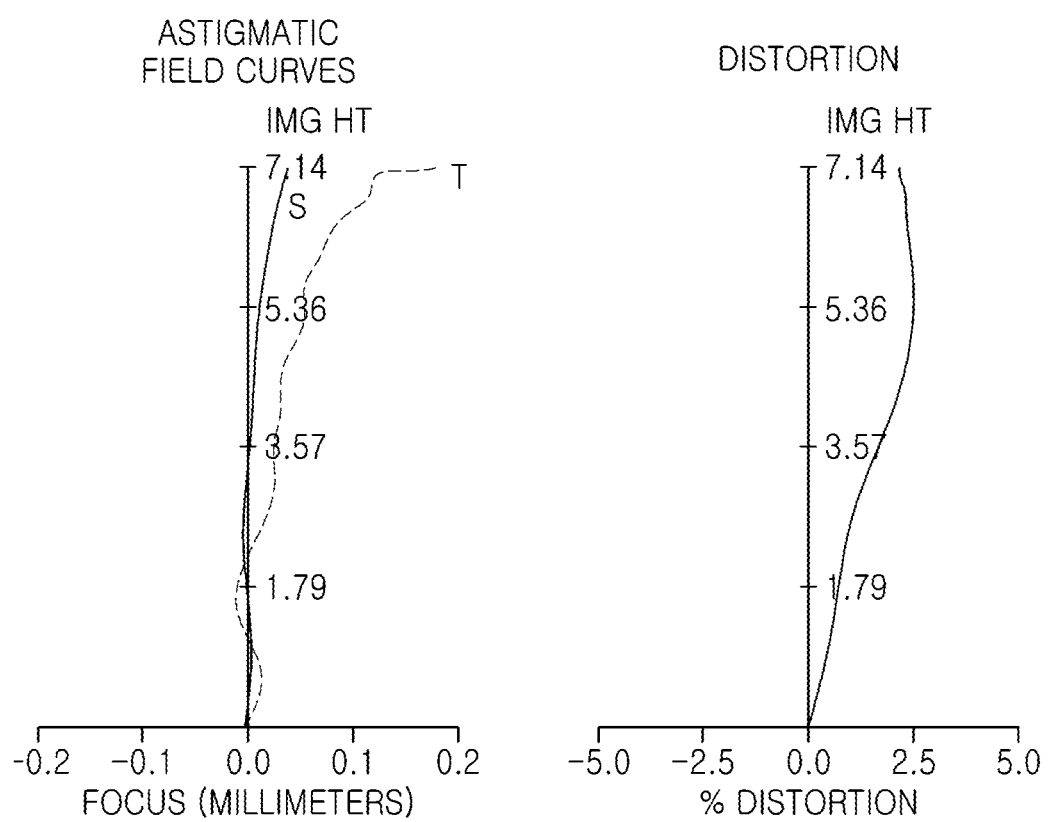
FIG. 13 is an aberration curve of the imaging lens system illustrated in FIG. 12.

The imaging lens system 400 configured as described above may exhibit aberration characteristics of the form illustrated in FIG. 13. Tables 7 and 8 show lens characteristics and aspheric values of the imaging lens system according to the present example embodiment.

TABLE 7

| Surface No. | Remark | Radius of curvature | Thickness/ distance | Refractive index | Abbe number |
|---|---|---|---|---|---|
| S1 | First lens | 3.227 | 1.352 | 1.546 | 56.0 |
| S2 | | 26.723 | 0.041 | | |
| S3 | Second lens | 11.928 | 0.348 | 1.640 | 24.0 |
| S4 | | 4.882 | 0.514 | | |
| S5 | Third lens | 16.384 | 0.459 | 1.546 | 56.0 |
| S6 | | 92.044 | 0.288 | | |
| S7 | Fourth lens | −127.916 | 0.664 | 1.619 | 25.9 |
| S8 | | 63.557 | 0.438 | | |
| S9 | Fifth lens | −34.181 | 0.515 | 1.546 | 56.0 |
| S10 | | −26.277 | 0.300 | | |
| S11 | Sixth lens | 39.904 | 0.663 | 1.570 | 37.4 |
| S12 | | 5.570 | 0.238 | | |
| S13 | Seventh lens | 2.473 | 0.679 | 1.546 | 56.0 |
| S14 | | 18.533 | 0.719 | | |
| S15 | Eighth lens | −40.989 | 0.702 | 1.537 | 55.7 |
| S16 | | 3.478 | 1.341 | | |
| S17 | Filter | | 0.210 | 1.518 | 64.2 |
| S18 | | | 0.375 | | |
| S19 | Imaging plane | | 0.015 | | |

TABLE 8

| Surface No. | S1 | S2 | S3 | S4 | S5 | S6 | S7 | S8 |
|---|---|---|---|---|---|---|---|---|
| K | −1.02.E+00 | 6.60.E+01 | 1.48.E+01 | 1.72.E+00 | 4.76.E+01 | 9.50.E+01 | 6.57.E+01 | 9.60.E+01 |
| A | 1.19.E−03 | −1.19.E−02 | −2.71.E−03 | 1.13.E−02 | −6.69.E−03 | −3.00.E−02 | −3.84.E−03 | 3.63.E−03 |
| B | 9.10.E−03 | −1.20.E−02 | −9.29.E−02 | −1.20.E−01 | −2.22.E−02 | 1.05.E−01 | −5.90.E−02 | −5.08.E−02 |
| C | −1.64.E−02 | 3.94.E−02 | 2.59.E−01 | 3.62.E−01 | 8.42.E−02 | −3.76.E−01 | 1.89.E−01 | 1.22.E−01 |
| D | 1.98.E−02 | −3.78.E−02 | −4.05.E−01 | −6.82.E−01 | −2.21.E−01 | 8.38.E−01 | −4.17.E−01 | −1.99.E−01 |
| E | −1.67.E−02 | 1.24.E−02 | 4.28.E−01 | 8.78.E−01 | 3.92.E−01 | −1.26.E+00 | 6.38.E−01 | 2.20.E−01 |
| F | 1.01.E−02 | 8.14.E−03 | −3.24.E−01 | −8.02.E−01 | −4.85.E−01 | 1.33.E+00 | −6.94.E−01 | −1.70.E−01 |
| G | −4.45.E−03 | −1.18.E−02 | 1.80.E−01 | 5.31.E−01 | 4.24.E−01 | −1.00.E+00 | 5.46.E−01 | 9.41.E−02 |
| H | 1.45.E−03 | 6.92.E−03 | −7.38.E−02 | −2.57.E−01 | −2.66.E−01 | 5.50.E−01 | −3.13.E−01 | −3.77.E−02 |
| J | −3.44.E−04 | −2.49.E−03 | 2.23.E−02 | 9.07.E−02 | 1.20.E−01 | −2.19.E−01 | 1.31.E−01 | 1.09.E−02 |

| Surface No. | S9 | S10 | S11 | S12 | S13 | S14 | S15 | S16 |
|---|---|---|---|---|---|---|---|---|
| K | −6.07.E+01 | 7.01.E+01 | 1.81.E+01 | −4.68.E+01 | −7.67.E+00 | 1.65.E+01 | 5.11.E+01 | −9.80.E+00 |
| A | −4.48.E−04 | −4.54.E−03 | −6.42.E−02 | −1.24.E−01 | −1.71.E−02 | 5.33.E−02 | −3.08.E−02 | −2.76.E−02 |
| B | 1.95.E−02 | 7.37.E−03 | 8.57.E−02 | 9.55.E−02 | 4.23.E−03 | −3.60.E−02 | 2.96.E−03 | 6.02.E−03 |
| C | −6.44.E−02 | 8.26.E−03 | −7.00.E−02 | −5.56.E−02 | −2.19.E−03 | 1.34.E−02 | 8.92.E−04 | −9.74.E−04 |
| D | 9.62.E−02 | −3.33.E−02 | 3.95.E−02 | 2.60.E−02 | 3.96.E−04 | −3.76.E−03 | −3.02.E−04 | 1.25.E−04 |
| E | −9.61.E−02 | 3.65.E−02 | −1.72.E−02 | −9.76.E−03 | −3.24.E−05 | 7.95.E−04 | 4.41.E−05 | −1.28.E−05 |
| F | 6.85.E−02 | −2.28.E−02 | 5.95.E−03 | 2.87.E−03 | 1.45.E−05 | −1.25.E−04 | −3.79.E−06 | 1.04.E−06 |
| G | −3.53.E−02 | 9.38.E−03 | −1.65.E−03 | −6.47.E−04 | −8.95.E−06 | 1.44.E−05 | 1.91.E−07 | −6.89.E−08 |
| H | 1.32.E−02 | −2.67.E−03 | 3.67.E−04 | 1.10.E−04 | 2.64.E−06 | −1.20.E−06 | −3.92.E−09 | 3.79.E−09 |
| J | −3.60.E−03 | 5.34.E−04 | −6.38.E−05 | −1.38.E−05 | −4.47.E−07 | 6.93.E−08 | −1.55.E−10 | −1.68.E−10 |

Figure 14:
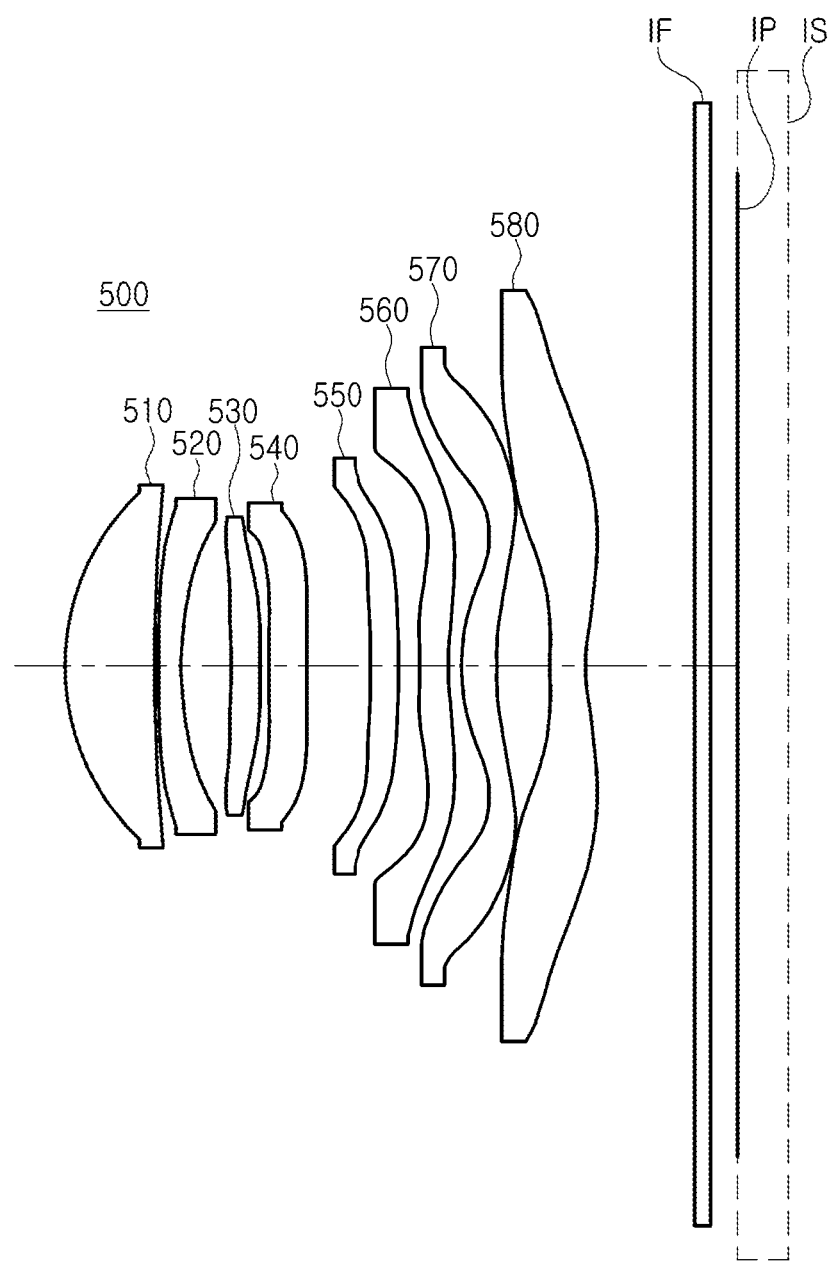
FIG. 14 is a configuration diagram of an imaging lens system according to a fifth example embodiment.

An imaging lens system according to a fifth example embodiment is described with reference to FIG. 14.

An imaging lens system 500 includes a first lens 510, a second lens 520, a third lens 530, a fourth lens 540, a fifth lens 550, a sixth lens 560, a seventh lens 570, and an eighth lens 580.

The first lens 510 has positive refractive power and has a convex object-side surface and a concave image-side surface. The second lens 520 has a negative refractive power and has a convex object-side surface and a concave image-side surface. The third lens 530 has positive refractive power and has a concave object-side surface and a convex image-side surface. The fourth lens 540 has positive refractive power and has a convex object-side surface and a concave image-side surface. The fifth lens 550 has positive refractive power and has a concave object-side surface and a convex image-side surface. The sixth lens 560 has a negative refractive power and has a convex object-side surface and a concave image-side surface. In addition, an inflection point is formed on the object-side surface and the image-side surface of the sixth lens 560. The seventh lens 570 has positive refractive power and has a convex object-side surface and a concave image-side surface. In addition, an inflection point is formed on the object-side surface and the image-side surface of the seventh lens 570. The eighth lens 580 has a negative refractive power and has a convex object-side surface and a concave image-side surface. In addition, an inflection point is formed on the object-side surface and the image-side surface of the eighth lens 580.

The imaging lens system 500 may further include a stop ST (not shown), a filter IF, and an imaging plane IP. For example, the stop ST may be disposed between the second lens 520 and the third lens 530 or between the third lens 530 and the fourth lens 540. The filter IF may be disposed between the eighth lens 580 and the imaging plane IP. For reference, the stop ST and the filter IF may be omitted if necessary. The imaging plane IP may be formed in a position in which light incident from the first lens 510 to the eighth lens 580 is imaged. For example, the imaging plane IP may be formed on one surface of the image sensor IS of the camera module or inside the image sensor IS.

Figure 15:
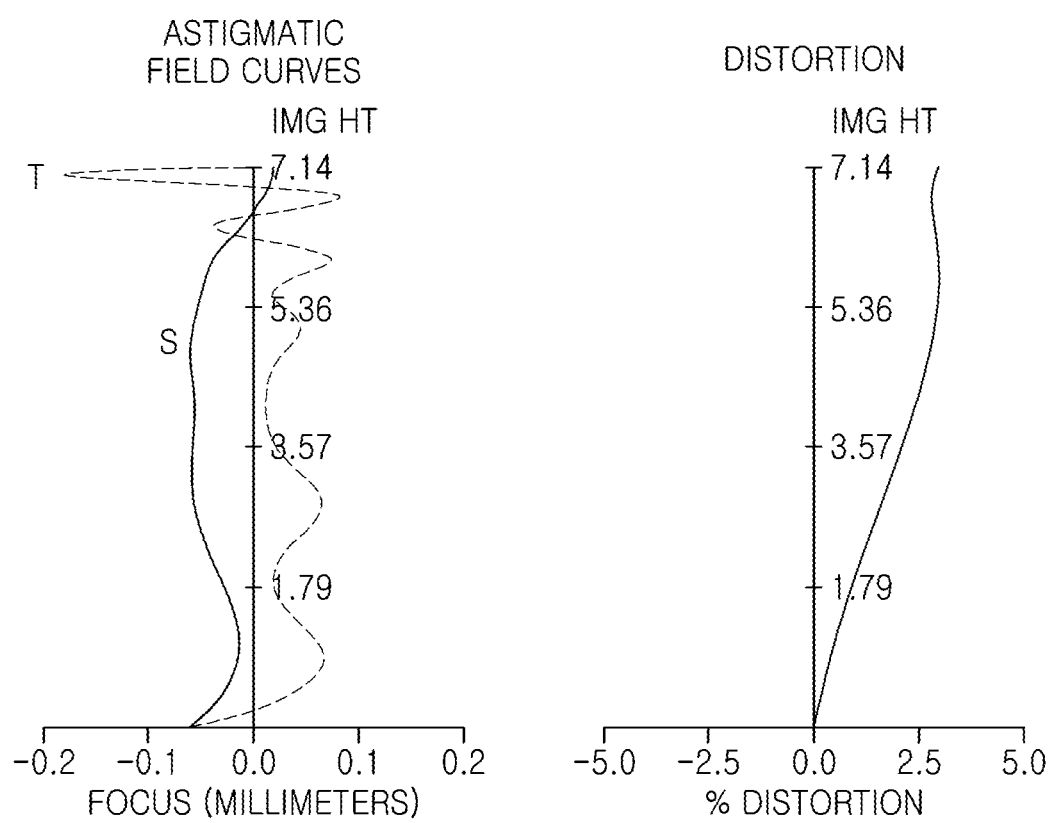
FIG. 15 is an aberration curve of the imaging lens system illustrated in FIG. 14.

The imaging lens system 500 configured as described above may exhibit aberration characteristics of the form illustrated in FIG. 15. Tables 9 and 10 show lens characteristics and aspheric values of the imaging lens system according to the present example embodiment.

TABLE 9

| Surface No. | Remark | Radius of curvature | Thickness/ distance | Refractive index | Abbe number |
|---|---|---|---|---|---|
| S1 | First lens | 3.390 | 1.300 | 1.546 | 56.0 |
| S2 | | 31.463 | 0.040 | | |
| S3 | Second lens | 9.048 | 0.345 | 1.656 | 21.5 |
| S4 | | 4.472 | 0.703 | | |
| S5 | Third lens | −46.133 | 0.419 | 1.546 | 56.0 |
| S6 | | −21.588 | 0.153 | | |
| S7 | Fourth lens | 24.794 | 0.543 | 1.667 | 20.4 |
| S8 | | 27.878 | 0.929 | | |
| S9 | Fifth lens | −78.317 | 0.400 | 1.546 | 56.0 |
| S10 | | −30.771 | 0.302 | | |
| S11 | Sixth lens | 14.560 | 0.420 | 1.570 | 37.4 |
| S12 | | 3.330 | 0.203 | | |
| S13 | Seventh lens | 2.045 | 0.520 | 1.546 | 56.0 |
| S14 | | 19.464 | 0.742 | | |
| S15 | Eighth lens | 39.967 | 0.520 | 1.537 | 55.7 |
| S16 | | 2.943 | 1.590 | | |
| S17 | Filter | | 0.210 | 1.518 | 64.2 |
| S18 | | | 0.375 | | |
| S19 | Imaging plane | | 0.015 | | |

TABLE 10

| Surface No. | S1 | S2 | S3 | S4 | S5 | S6 | S7 | S8 |
|---|---|---|---|---|---|---|---|---|
| K | −9.97.E−01 | 9.56.E+01 | 8.37.E+00 | 8.41.E−01 | 4.55.E+00 | 9.50.E+01 | 6.57.E+01 | −8.91.E+01 |
| A | 2.84.E−03 | −1.24.E−02 | −2.14.E−02 | −1.10.E−02 | −3.68.E−05 | −5.11.E−03 | −2.08.E−02 | −1.29.E−02 |
| B | 1.44.E−03 | 2.00.E−02 | 2.24.E−02 | 6.09.E−03 | −4.75.E−03 | −1.73.E−02 | −7.79.E−03 | −6.45.E−03 |
| C | −2.29.E−03 | −2.27.E−02 | −2.83.E−02 | −1.39.E−02 | 1.17.E−02 | 6.31.E−02 | 3.09.E−02 | 1.46.E−02 |
| D | 2.96.E−03 | 1.97.E−02 | 3.33.E−02 | 3.54.E−02 | −2.72.E−02 | −1.45.E−01 | −7.28.E−02 | −2.21.E−02 |
| E | −2.71.E−03 | −1.29.E−02 | −3.19.E−02 | −6.08.E−02 | 4.25.E−02 | 2.24.E−01 | 1.14.E−01 | 2.29.E−02 |
| F | 1.77.E−03 | 6.30.E−03 | 2.34.E−02 | 6.99.E−02 | −4.61.E−02 | −2.42.E−01 | −1.24.E−01 | −1.70.E−02 |
| G | −8.29.E−04 | −2.26.E−03 | −1.28.E−02 | −5.56.E−02 | 3.56.E−02 | 1.87.E−01 | 9.72.E−02 | 9.10.E−03 |
| H | 2.79.E−04 | 5.86.E−04 | 5.14.E−03 | 3.12.E−02 | −1.98.E−02 | −1.04.E−01 | −5.50.E−02 | −3.56.E−03 |
| J | −6.73.E−05 | −1.08.E−04 | −1.51.E−03 | −1.24.E−02 | 7.94.E−03 | 4.19.E−02 | 2.25.E−02 | 1.01.E−03 |

| Surface No. | S9 | S10 | S11 | S12 | S13 | S14 | S15 | S16 |
|---|---|---|---|---|---|---|---|---|
| K | 9.60.E+01 | 7.01.E+01 | 1.81.E+01 | −2.66.E+01 | −7.92.E+00 | 1.65.E+01 | 5.11.E+01 | −1.07.E+01 |
| A | 8.89.E−03 | 3.95.E−02 | −6.13.E−04 | −6.34.E−02 | 3.03.E−02 | 6.00.E−02 | −7.01.E−02 | −4.04.E−02 |
| B | −1.84.E−02 | −4.46.E−02 | 1.78.E−02 | 2.96.E−02 | −3.47.E−02 | −3.15.E−02 | 2.42.E−02 | 1.39.E−02 |
| C | 2.73.E−02 | 1.88.E−02 | −2.03.E−02 | −2.11.E−02 | 2.10.E−02 | 7.39.E−03 | −7.74.E−03 | −4.00.E−03 |
| D | 9.32.E−03 | −3.15.E−03 | 1.21.E−02 | −5.59.E−03 | −9.86.E−03 | −2.35.E−04 | 2.43.E−03 | 9.71.E−04 |
| E | −1.11.E−02 | −2.18.E−03 | −5.19.E−03 | 3.62.E−03 | 3.34.E−03 | −4.50.E−04 | −5.56.E−04 | −1.86.E−04 |
| F | 7.23.E−03 | 2.37.E−03 | 1.74.E−03 | −1.21.E−03 | −8.11.E−04 | 1.65.E−04 | 8.62.E−05 | 2.66.E−05 |
| G | −3.21.E−03 | −1.22.E−03 | −4.52.E−04 | 2.58.E−04 | 1.41.E−04 | −3.21.E−05 | −9.20.E−06 | −2.75.E−06 |
| H | 1.02.E−03 | 4.07.E−04 | 8.76.E−05 | −3.75.E−05 | −1.77.E−05 | 4.04.E−06 | 6.93.E−07 | 2.06.E−07 |
| J | −2.35.E−04 | −9.27.E−05 | −1.23.E−05 | 3.80.E−06 | 1.57.E−06 | −3.48.E−07 | −3.72.E−08 | −1.11.E−08 |

Figure 16:
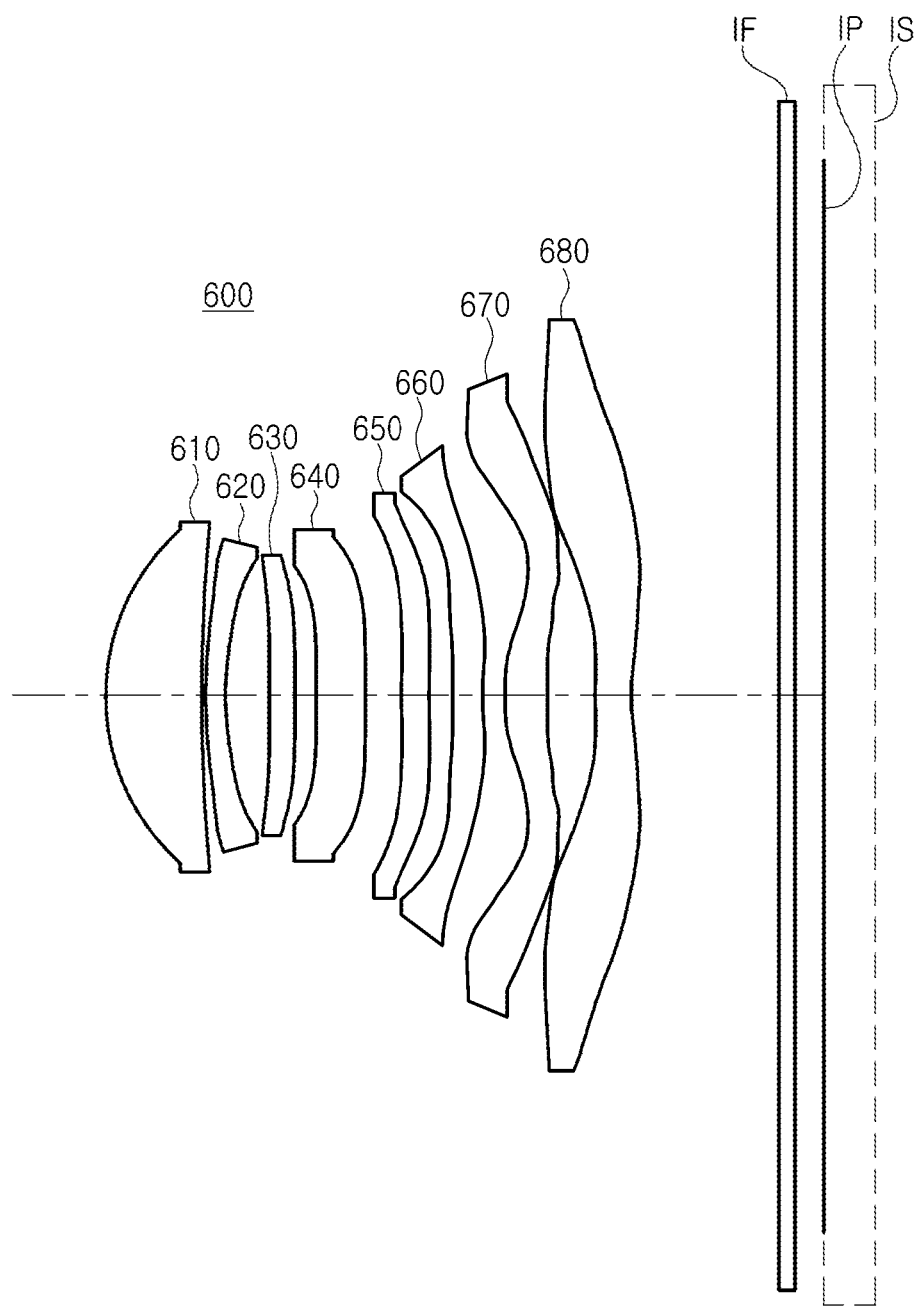
FIG. 16 is a configuration diagram of an imaging lens system according to a sixth example embodiment.

An imaging lens system according to a sixth example embodiment is described with reference to FIG. 16.

An imaging lens system 600 includes a first lens 610, a second lens 620, a third lens 630, a fourth lens 640, a fifth lens 650, a sixth lens 660, a seventh lens 670, and an eighth lens 680.

The first lens 610 has positive refractive power and has a convex object-side surface and a concave image-side surface. The second lens 620 has a negative refractive power and has a convex object-side surface and a concave image-side surface. The third lens 630 has positive refractive power and has a convex object-side surface and a concave image-side surface. The fourth lens 640 has positive refractive power and has a concave object-side surface and a convex image-side surface. The fifth lens 650 has positive refractive power and has a concave object-side surface and a convex image-side surface. The sixth lens 660 has a negative refractive power and has a convex object-side surface and a concave image-side surface. In addition, an inflection point is formed on the object-side surface and the image-side surface of the sixth lens 660. The seventh lens 670 has positive refractive power and has a convex object-side surface and a concave image-side surface. In addition, an inflection point is formed on the object-side surface and the image-side surface of the seventh lens 670. The eighth lens 680 has a negative refractive power and has a concave object-side surface and a concave image-side surface. In addition, an inflection point is formed on the object-side surface and the image-side surface of the eighth lens 680.

The imaging lens system 600 may further include a stop ST (not shown), a filter IF, and an imaging plane IP. For example, the stop ST may be disposed between the second lens 620 and the third lens 630 or between the third lens 630 and the fourth lens 640. The filter IF may be disposed between the eighth lens 680 and the imaging plane IP. For reference, the stop ST and the filter IF may be omitted if necessary. The imaging plane IP may be formed in a position in which light incident from the first lens 610 to the eighth lens 680 is imaged. For example, the imaging plane IP may be formed on one surface of the image sensor IS of the camera module or inside the image sensor IS.

Figure 17:
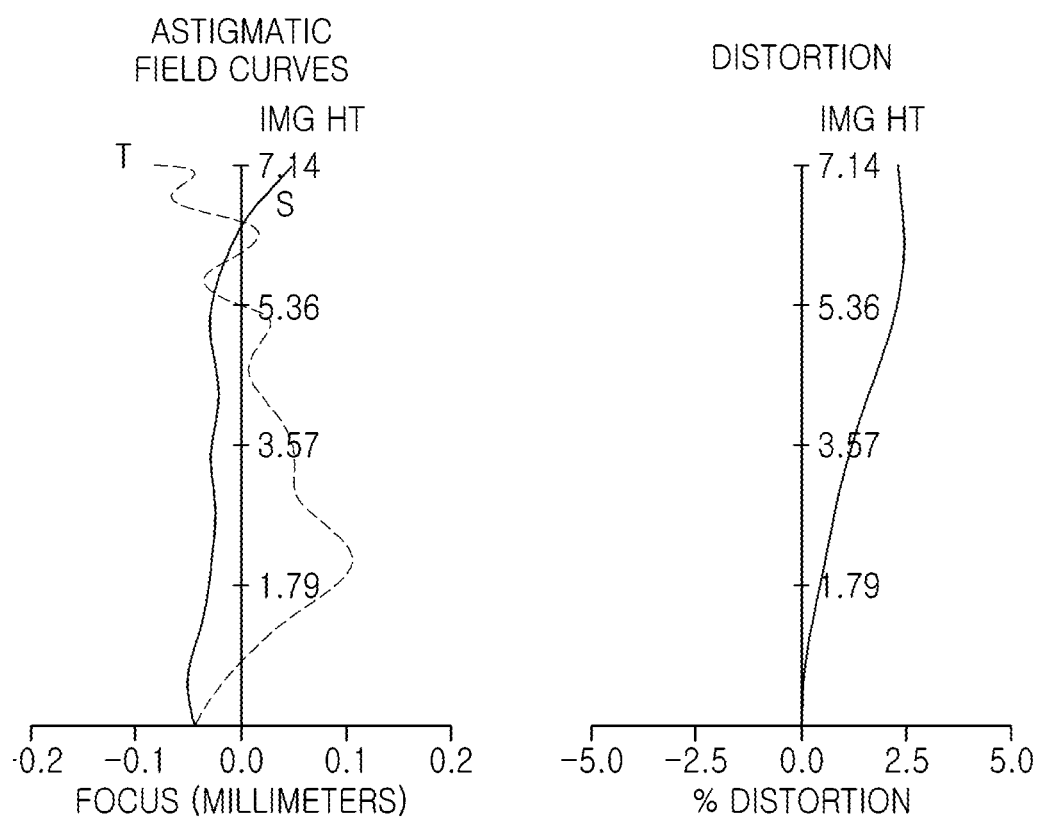
FIG. 17 is an aberration curve of the imaging lens system illustrated in FIG. 16.

The imaging lens system 600 configured as described above may exhibit aberration characteristics of the form illustrated in FIG. 17. Tables 11 and 12 show lens characteristics and aspheric values of the imaging lens system according to the present example embodiment.

TABLE 11

| Surface No. | Remark | Radius of curvature | Thickness/ distance | Refractive index | Abbe number |
|---|---|---|---|---|---|
| S1 | First lens | 2.957 | 1.223 | 1.546 | 56.0 |
| S2 | | 18.307 | 0.066 | | |
| S3 | Second lens | 9.009 | 0.250 | 1.667 | 20.4 |
| S4 | | 4.531 | 0.569 | | |
| S5 | Third lens | 59.645 | 0.335 | 1.546 | 56.0 |
| S6 | | 84.387 | 0.282 | | |
| S7 | Fourth lens | −31.496 | 0.623 | 1.644 | 23.5 |
| S8 | | −30.604 | 0.500 | | |
| S9 | Fifth lens | −54.898 | 0.343 | 1.546 | 56.0 |
| S10 | | −38.968 | 0.298 | | |
| S11 | Sixth lens | 23.468 | 0.414 | 1.570 | 37.4 |
| S12 | | 3.636 | 0.286 | | |
| S13 | Seventh lens | 1.892 | 0.551 | 1.546 | 56.0 |
| S14 | | 17.196 | 0.633 | | |
| S15 | Eighth lens | −34.440 | 0.458 | 1.546 | 56.0 |
| S16 | | 3.321 | 1.943 | | |
| S17 | Filter | | 0.210 | 1.518 | 64.2 |
| S18 | | | 0.379 | | |
| S19 | Imaging plane | | 0.011 | | |

TABLE 12

| Surface No. | S1 | S2 | S3 | S4 | S5 | S6 | S7 | S8 |
|---|---|---|---|---|---|---|---|---|
| K | −9.62.E−01 | 4.27.E+01 | 1.35.E+01 | 2.17.E+00 | 4.76.E+01 | 9.50.E+01 | 6.57.E+01 | 7.19.E+01 |
| A | 3.22.E−03 | −8.24.E−03 | −1.38.E−02 | −7.29.E−03 | −1.30.E−02 | −1.17.E−02 | −9.47.E−03 | −3.65.E−03 |
| B | 7.15.E−03 | 4.30.E−03 | 1.94.E−03 | −3.77.E−03 | 1.11.E−03 | −1.70.E−02 | −2.14.E−03 | −1.18.E−02 |
| C | −1.64.E−02 | −9.46.E−03 | −1.07.E−03 | 2.34.E−02 | −1.06.E−02 | 4.06.E−02 | −3.90.E−02 | 9.90.E−03 |
| D | 2.59.E−02 | 1.83.E−02 | 3.96.E−03 | −7.52.E−02 | 3.89.E−02 | −9.65.E−02 | 1.42.E−01 | −2.37.E−03 |
| E | −2.81.E−02 | −2.21.E−02 | −2.20.E−03 | 1.65.E−01 | 4.77.E−02 | 1.67.E−01 | −2.98.E−01 | −7.79.E−03 |
| F | 2.15.E−02 | 1.82.E−02 | −2.50.E−03 | −2.45.E−01 | −1.34.E−01 | −2.06.E−01 | 4.11.E−01 | 1.27.E−02 |
| G | −1.19.E−02 | −1.07.E−02 | 5.05.E−03 | 2.56.E−01 | 1.93.E−01 | 1.83.E−01 | −3.93.E−01 | −1.07.E−02 |
| H | 4.79.E−03 | 4.65.E−03 | −4.20.E−03 | −1.91.E−01 | −1.78.E−01 | −1.19.E−01 | 2.68.E−01 | 6.04.E−03 |
| J | −1.40.E−03 | −1.48.E−03 | 2.15.E−03 | 1.03.E−01 | 1.11.E−01 | 5.60.E−02 | −1.31.E−01 | −2.39.E−03 |

| Surface No. | S9 | S10 | S11 | S12 | S13 | S14 | S15 | S16 |
|---|---|---|---|---|---|---|---|---|
| K | 9.60.E+01 | 7.01.E+01 | 1.81.E+01 | −4.91.E+01 | −6.65.E+00 | 1.65.E+01 | 5.11.E+01 | −1.25.E+01 |
| A | 2.58.E−02 | 4.33.E−02 | −8.70.E−02 | −1.63.E−01 | −9.08.E−03 | 6.91.E−02 | −5.93.E−02 | −4.63.E−02 |
| B | −5.67.E−02 | −5.34.E−02 | 1.52.E−01 | 1.45.E−01 | −2.71.E−03 | −5.27.E−02 | 1.64.E−02 | 1.53.E−02 |
| C | 4.70.E−02 | 3.16.E−02 | −1.73.E−01 | −9.93.E−02 | −5.26.E−04 | −2.10.E−03 | −3.10.E−03 | −3.87.E−03 |
| D | −3.25.E−02 | −2.61.E−02 | 1.39.E−01 | 5.41.E−02 | 5.74.E−04 | −6.40.E−03 | 8.10.E−04 | 7.74.E−04 |
| E | 2.22.E−02 | 2.62.E−02 | −8.36.E−02 | −2.32.E−02 | −2.66.E−04 | 1.28.E−03 | −2.20.E−04 | −1.26.E−04 |
| F | −1.37.E−02 | −2.01.E−02 | 3.84.E−02 | 7.74.E−03 | 7.71.E−05 | −1.65.E−04 | 4.34.E−05 | 1.68.E−05 |
| G | 6.64.E−03 | 1.07.E−02 | −1.34.E−02 | −1.99.E−03 | −1.55.E−05 | 1.07.E−05 | −5.90.E−06 | −1.82.E−06 |
| H | −2.38.E−03 | −3.95.E−03 | 3.54.E−03 | 3.88.E−04 | 2.38.E−06 | 3.67.E−07 | 5.65.E−07 | 1.55.E−07 |
| J | 6.14.E−04 | 1.03.E−03 | −6.97.E−04 | −5.67.E−05 | −2.90.E−07 | −1.63.E−07 | −3.85.E−08 | −1.00.E−08 |

Figure 18:
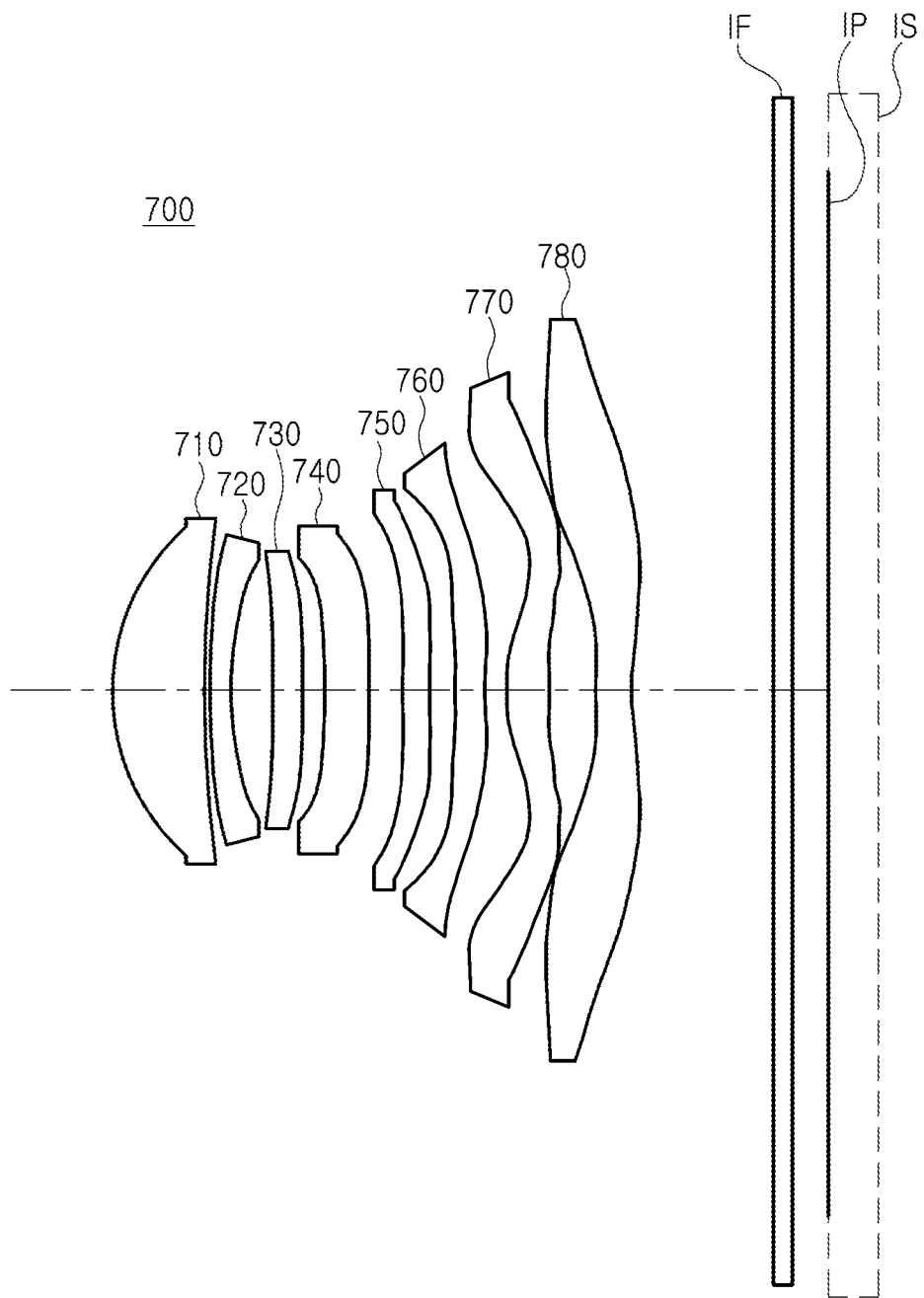
FIG. 18 is a configuration diagram of an imaging lens system according to a seventh example embodiment.

An imaging lens system according to a seventh example embodiment is described with reference to FIG. 18.

An imaging lens system 700 includes a first lens 710, a second lens 720, a third lens 730, a fourth lens 740, a fifth lens 750, a sixth lens 760, a seventh lens 770, and an eighth lens 780.

The first lens 710 has positive refractive power and has a convex object-side surface and a concave image-side surface. The second lens 720 has a negative refractive power and has a convex object-side surface and a concave image-side surface. The third lens 730 has positive refractive power and has a convex object-side surface and a concave image-side surface. The fourth lens 740 has a negative refractive power and has a concave object-side surface and a convex image-side surface. The fifth lens 750 has positive refractive power and has a concave object-side surface and a convex image-side surface. The sixth lens 760 has a negative refractive power and has a convex object-side surface and a concave image-side surface. In addition, an inflection point is formed on the object-side surface and the image-side surface of the sixth lens 760. The seventh lens 770 has positive refractive power and has a convex object-side surface and a concave image-side surface. In addition, an inflection point is formed on the object-side surface and the image-side surface of the seventh lens 770. The eighth lens 780 has a negative refractive power and has a concave object-side surface and a concave image-side surface. In addition, an inflection point is formed on the object-side surface and the image-side surface of the eighth lens 780.

The imaging lens system 700 may further include a stop ST (not shown), a filter IF, and an imaging plane IP. For example, the stop ST may be disposed between the second lens 720 and the third lens 730 or between the third lens 730 and the fourth lens 740. The filter IF may be disposed between the eighth lens 780 and the imaging plane IP. For reference, the stop ST and the filter IF may be omitted if necessary. The imaging plane IP may be formed in a position in which light incident from the first lens 710 to the eighth lens 780 is imaged. For example, the imaging plane IP may be formed on one surface of the image sensor IS of the camera module or inside the image sensor IS.

Figure 19:
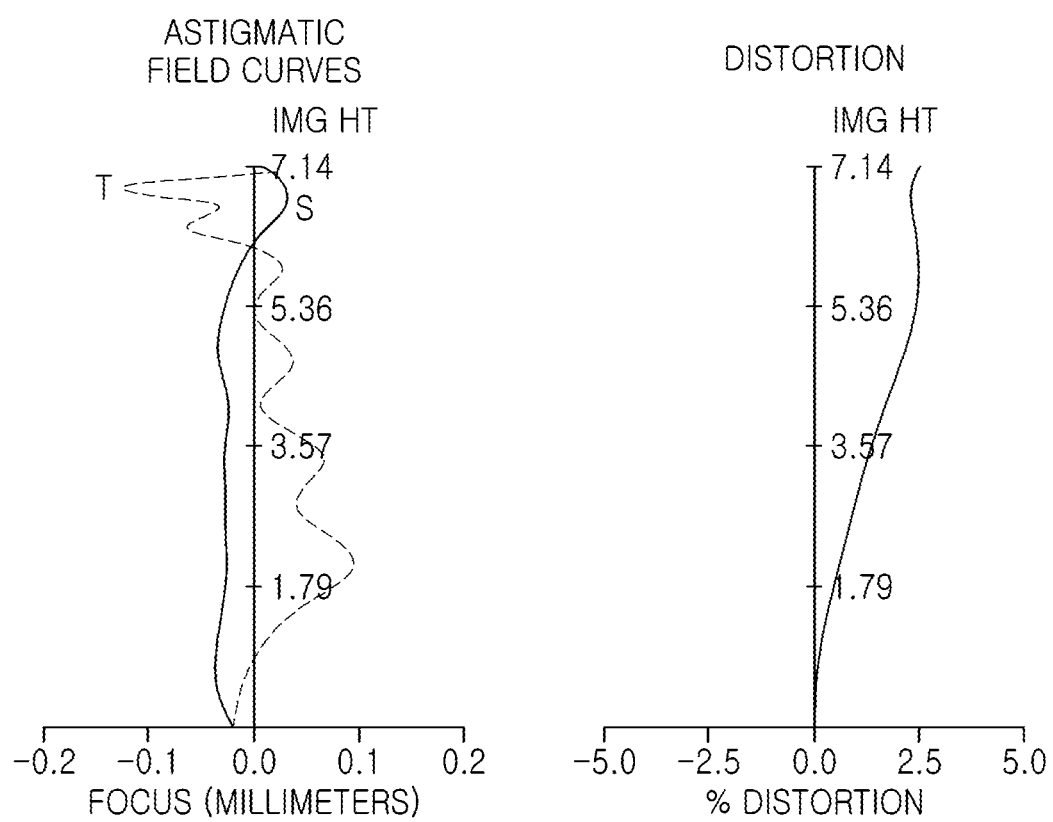
FIG. 19 is an aberration curve of the imaging lens system illustrated in FIG. 18.

The imaging lens system 700 configured as described above may exhibit aberration characteristics of the form illustrated in FIG. 19. Tables 13 and 14 show lens characteristics and aspheric values of the imaging lens system according to the present example embodiment.

TABLE 13

| Surface No. | Remark | Radius of curvature | Thickness/ distance | Refractive index | Abbe number |
|---|---|---|---|---|---|
| S1 | First lens | 2.600 | 1.086 | 1.546 | 56.0 |
| S2 | | 16.006 | 0.041 | | |
| S3 | Second lens | 7.963 | 0.220 | 1.667 | 20.4 |
| S4 | | 4.028 | 0.498 | | |
| S5 | Third lens | 49.979 | 0.337 | 1.546 | 56.0 |
| S6 | | 182.365 | 0.258 | | |
| S7 | Fourth lens | −19.428 | 0.519 | 1.644 | 23.5 |
| S8 | | −21.775 | 0.407 | | |
| S9 | Fifth lens | −44.628 | 0.300 | 1.546 | 56.0 |
| S10 | | −37.450 | 0.244 | | |
| S11 | Sixth lens | 20.725 | 0.408 | 1.570 | 37.4 |
| S12 | | 3.034 | 0.238 | | |
| S13 | Seventh lens | 1.604 | 0.482 | 1.546 | 56.0 |
| S14 | | 14.933 | 0.553 | | |
| S15 | Eighth lens | −30.175 | 0.403 | 1.546 | 56.0 |
| S16 | | 2.899 | 1.632 | | |
| S17 | Filter | | 0.210 | 1.518 | 64.2 |
| S18 | | | 0.385 | | |
| S19 | Imaging plane | | 0.005 | | |

TABLE 14

| Surface No. | S1 | S2 | S3 | S4 | S5 | S6 | S7 | S8 |
|---|---|---|---|---|---|---|---|---|
| K | −9.61.E−01 | 4.22.E+01 | 1.35.E+01 | 2.12.E+00 | 4.76.E+01 | 9.50.E+01 | 6.57.E+01 | 8.43.E+01 |
| A | 5.06.E−03 | −1.25.E−02 | −1.97.E−02 | −9.75.E−03 | −1.95.E−02 | −2.00.E−02 | −1.74.E−02 | −8.27.E−03 |
| B | 1.12.E−02 | 8.76.E−03 | 4.52.E−03 | −1.01.E−02 | 3.48.E−03 | −1.42.E−02 | 2.11.E−02 | −1.16.E−03 |
| C | −3.18.E−02 | −2.13.E−02 | −1.78.E−03 | 7.59.E−02 | −3.64.E−02 | 8.85.E−03 | −2.15.E−01 | −5.86.E−02 |
| D | 6.38.E−02 | 4.47.E−02 | −5.68.E−03 | −3.14.E−01 | 8.13.E−02 | 9.02.E−03 | 8.21.E−01 | 1.93.E−01 |
| E | −8.85.E−02 | −5.75.E−02 | 4.39.E−02 | 8.59.E−01 | −4.78.E−02 | −4.77.E−02 | −2.01.E+00 | −3.59.E−01 |
| F | 8.73.E−02 | 4.85.E−02 | −9.82.E−02 | −1.60.E+00 | −1.76.E−01 | 9.27.E−02 | 3.35.E+00 | 4.41.E−01 |
| G | −6.23.E−02 | −2.77.E−02 | 1.25.E−01 | 2.09.E+00 | 5.32.E−01 | −1.12.E−01 | −3.97.E+00 | −3.83.E−01 |
| H | 3.24.E−02 | 1.04.E−02 | −1.05.E−01 | −1.96.E+00 | −7.53.E−01 | 9.54.E−02 | 3.39.E+00 | 2.42.E−01 |
| J | −1.23.E−02 | −2.20.E−03 | 6.13.E−02 | 1.33.E+00 | 6.66.E−01 | −6.03.E−02 | −2.10.E+00 | −1.11.E−01 |

| Surface No. | S9 | S10 | S11 | S12 | S13 | S14 | S15 | S16 |
|---|---|---|---|---|---|---|---|---|
| K | 9.60.E+01 | 7.01.E+01 | 1.81.E+01 | −4.75.E+01 | −6.73.E+00 | 1.65.E+01 | 5.11.E+01 | −1.20.E+01 |
| A | 3.67.E−02 | 5.75.E−02 | −1.32.E−01 | −2.43.E−01 | −1.40.E−02 | 1.06.E−01 | −8.75.E−02 | −6.99.E−02 |
| B | −9.30.E−02 | −7.66.E−02 | 3.10.E−01 | 2.77.E−01 | −5.15.E−03 | −1.09.E−01 | 3.04.E−02 | 3.12.E−02 |
| C | 5.72.E−02 | 2.13.E−02 | −4.67.E−01 | −2.39.E−01 | −1.65.E−03 | 6.13.E−02 | −6.53.E−03 | −1.07.E−02 |
| D | 1.86.E−02 | −4.25.E−03 | 4.95.E−01 | 1.60.E−01 | 2.32.E−03 | −2.43.E−02 | 2.00.E−03 | 2.93.E−03 |
| E | −7.22.E−02 | 3.22.E−02 | −3.95.E−01 | −8.41.E−02 | −1.51.E−03 | 6.72.E−03 | −7.34.E−04 | −6.64.E−04 |
| F | 8.01.E−02 | −5.42.E−02 | 2.40.E−01 | 3.43.E−02 | 6.27.E−04 | −1.25.E−03 | 1.98.E−04 | 1.24.E−04 |
| G | −5.75.E−02 | 4.62.E−02 | −1.12.E−01 | −1.08.E−02 | −1.82.E−04 | 1.43.E−04 | −3.64.E−05 | −1.83.E−05 |
| H | 2.97.E−02 | −2.46.E−02 | 3.93.E−02 | 2.59.E−03 | 3.92.E−05 | −5.73.E−06 | 4.64.E−06 | 2.09.E−06 |
| J | −1.13.E−02 | 8.83.E−03 | −1.03.E−02 | −4.67.E−04 | −6.41.E−06 | −1.04.E−06 | −4.19.E−07 | −1.78.E−07 |

Figure 20:
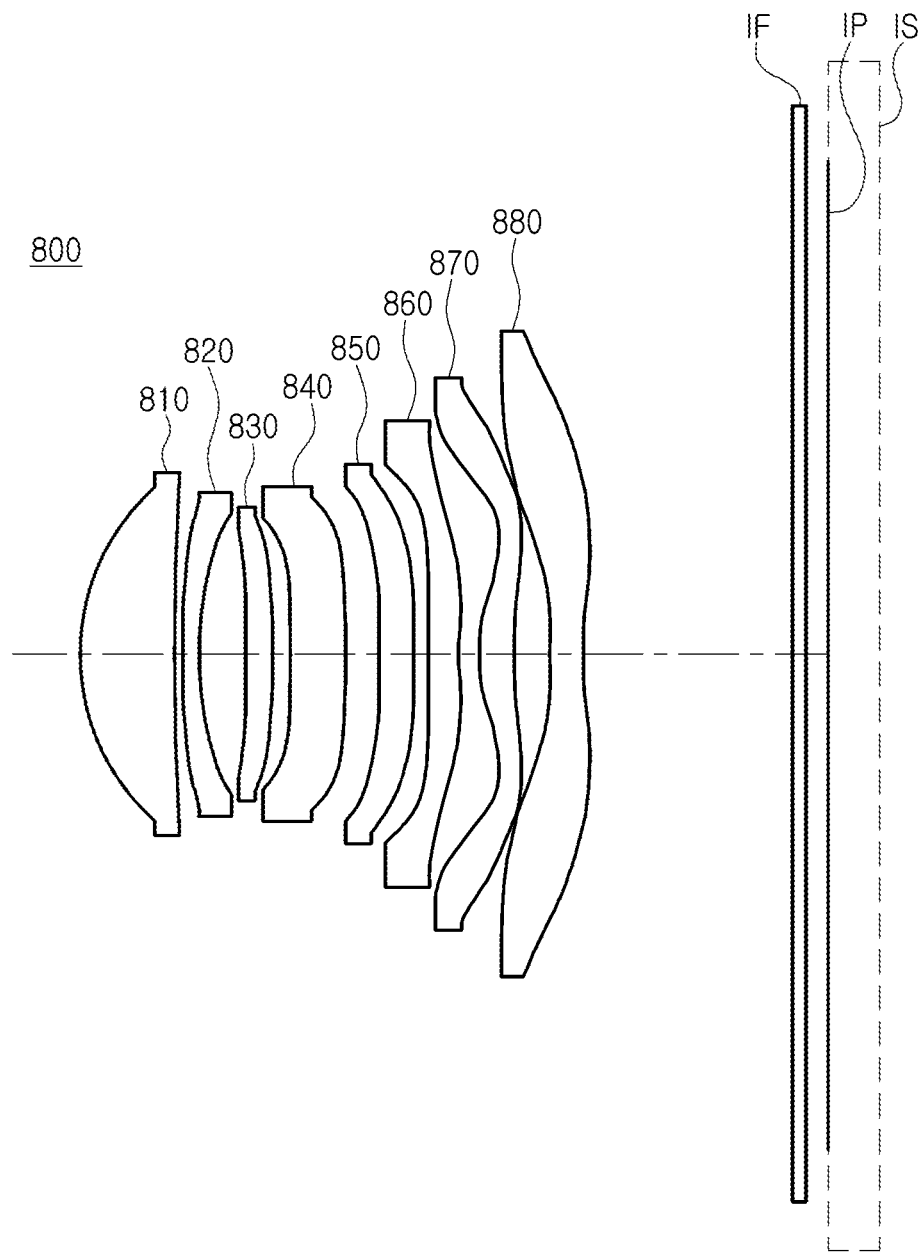
FIG. 20 is a configuration diagram of an imaging lens system according to an eighth example embodiment.

An imaging lens system according to an eighth example embodiment is described with reference to FIG. 20.

An imaging lens system 800 includes a first lens 810, a second lens 820, a third lens 830, a fourth lens 840, a fifth lens 850, a sixth lens 860, a seventh lens 870, and an eighth lens 880.

The first lens 810 has positive refractive power and has a convex object-side surface and a concave image-side surface. The second lens 820 has a negative refractive power and has a convex object-side surface and a concave image-side surface. The third lens 830 has positive refractive power and has a concave object-side surface and a convex image-side surface. The fourth lens 840 has a negative refractive power and has a concave object-side surface and a convex image-side surface. The fifth lens 850 has positive refractive power and has a concave object-side surface and a convex image-side surface. The sixth lens 860 has a negative refractive power and has a convex object-side surface and a concave image-side surface. In addition, an inflection point is formed on the object-side surface and the image-side surface of the sixth lens 860. The seventh lens 870 has positive refractive power and has a convex object-side surface and a concave image-side surface. In addition, an inflection point is formed on the object-side surface and the image-side surface of the seventh lens 870. The eighth lens 880 has a negative refractive power and has a concave object-side surface and a concave image-side surface. In addition, an inflection point is formed on the object-side surface and the image-side surface of the eighth lens 880.

The imaging lens system 800 may further include a stop ST (not shown), a filter IF, and an imaging plane IP. For example, the stop ST may be disposed between the second lens 820 and the third lens 830 or between the third lens 830 and the fourth lens 840. The filter IF may be disposed between the eighth lens 880 and the imaging plane IP. For reference, the stop ST and the filter IF may be omitted if necessary. The imaging plane IP may be formed in a position in which light incident from the first lens 810 to the eighth lens 880 is imaged. For example, the imaging plane IP may be formed on one surface of the image sensor IS of the camera module or inside the image sensor IS.

Figure 21:
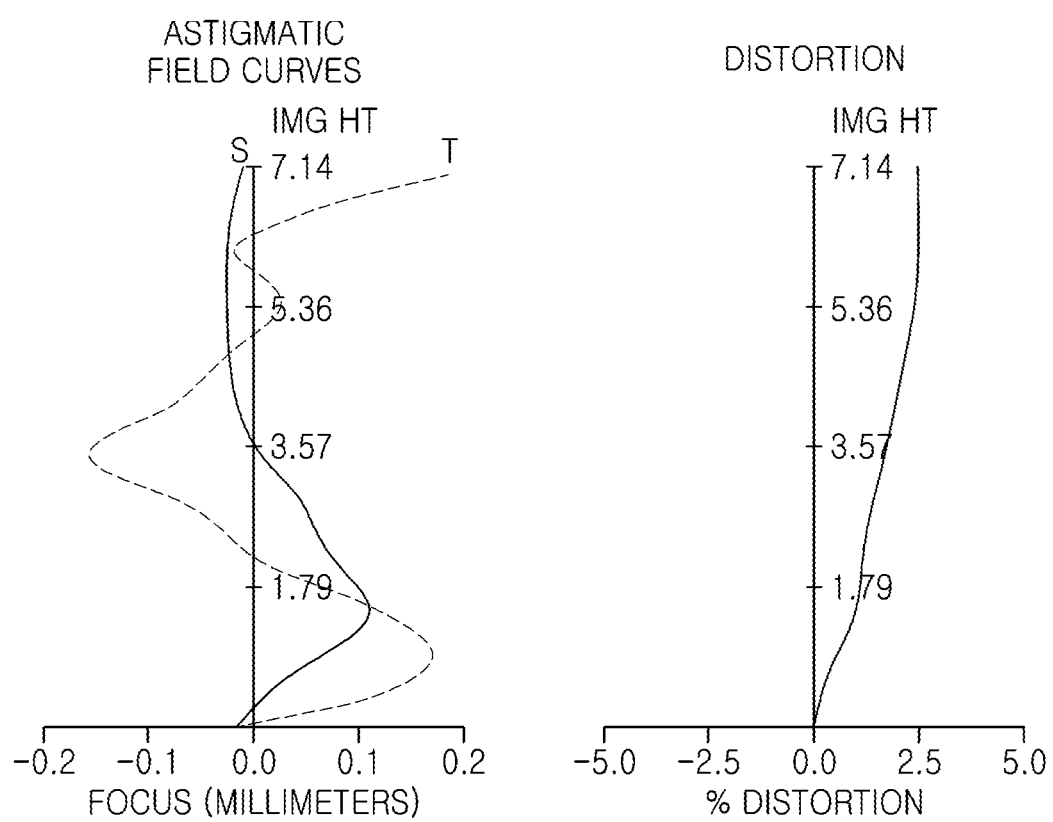
FIG. 21 is an aberration curve of the imaging lens system illustrated in FIG. 20.

The imaging lens system 800 configured as described above may exhibit aberration characteristics of the form illustrated in FIG. 21. Tables 15 and 16 show lens characteristics and aspheric values of the imaging lens system according to the present example embodiment.

TABLE 15

| Surface No. | Remark | Radius of curvature | Thickness/ distance | Refractive index | Abbe number |
|---|---|---|---|---|---|
| S1 | First lens | 3.919 | 1.576 | 1.546 | 56.0 |
| S2 | | 22.548 | 0.136 | | |
| S3 | Second lens | 11.579 | 0.300 | 1.677 | 19.2 |
| S4 | | 6.282 | 0.788 | | |
| S5 | Third lens | −227.038 | 0.426 | 1.546 | 56.0 |
| S6 | | −129.645 | 0.318 | | |
| S7 | Fourth lens | −32.433 | 0.928 | 1.644 | 23.5 |
| S8 | | −46.851 | 0.589 | | |
| S9 | Fifth lens | −34.667 | 0.557 | 1.546 | 56.0 |
| S10 | | −26.972 | 0.272 | | |
| S11 | Sixth lens | 34.051 | 0.510 | 1.570 | 37.4 |
| S12 | | 3.904 | 0.341 | | |
| S13 | Seventh lens | 2.152 | 0.602 | 1.546 | 56.0 |
| S14 | | 31.846 | 0.616 | | |
| S15 | Eighth lens | −40.935 | 0.550 | 1.546 | 56.0 |
| S16 | | 4.139 | 3.555 | | |
| S17 | Filter | | 0.210 | 1.518 | 64.2 |
| S18 | | | 0.375 | | |
| S19 | Imaging surface | | 0.015 | | |

TABLE 16

| Surface No. | S1 | S2 | S3 | S4 | S5 | S6 | S7 | S8 |
|---|---|---|---|---|---|---|---|---|
| K | −9.95.E−01 | 4.22.E+01 | 1.34.E+01 | 1.93.E+00 | 4.76.E+01 | 9.50.E+01 | 6.57.E+01 | 7.23.E+01 |
| A | 5.64.E−03 | −3.77.E−03 | −6.50.E−03 | −3.42.E−03 | −5.19.E−03 | −4.29.E−03 | −6.71.E−03 | 1.04.E−03 |
| B | −5.69.E−03 | 2.28.E−04 | 3.44.E−04 | −5.42.E−04 | −3.18.E−03 | −8.06.E−03 | 2.21.E−03 | −1.75.E−02 |
| C | 5.33.E−03 | 1.31.E−03 | 1.40.E−03 | −1.86.E−04 | 3.48.E−03 | 1.11.E−02 | 1.39.E−03 | 2.76.E−02 |
| D | −3.09.E−03 | −1.92.E−03 | −1.97.E−03 | 3.16.E−03 | −3.45.E−03 | −1.31.E−02 | −1.61.E−02 | −2.91.E−02 |
| E | 1.20.E−03 | 1.69.E−03 | 1.95.E−03 | −5.48.E−03 | 2.37.E−03 | 1.12.E−02 | 2.88.E−02 | 2.12.E−02 |
| F | −3.24.E−04 | −1.02.E−03 | −1.35.E−03 | 5.31.E−03 | −9.04.E−04 | −6.94.E−03 | −2.81.E−02 | −1.10.E−02 |
| G | 6.43.E−05 | 4.28.E−04 | 6.58.E−04 | −3.38.E−03 | 3.50.E−05 | 3.14.E−03 | 1.76.E−02 | 4.11.E−03 |
| H | −9.92.E−06 | −1.28.E−04 | −2.26.E−04 | 1.49.E−03 | 1.61.E−04 | −1.04.E−03 | −7.53.E−03 | −1.12.E−03 |
| J | 1.28.E−06 | 2.71.E−05 | 5.47.E−05 | −4.67.E−04 | −9.51.E−05 | 2.51.E−04 | 2.25.E−03 | 2.20.E−04 |

| Surface No. | S9 | S10 | S11 | S12 | S13 | S14 | S15 | S16 |
|---|---|---|---|---|---|---|---|---|
| K | 7.15.E+01 | 7.01.E+01 | 1.81.E+01 | −4.99.E+01 | −7.45.E+00 | 1.65.E+01 | 5.11.E+01 | −1.49.E+01 |
| A | 7.53.E−03 | 2.83.E−02 | −6.20.E−02 | −1.04.E−01 | −2.12.E−03 | 4.17.E−02 | −4.17.E−02 | −2.97.E−02 |
| B | −1.58.E−02 | −3.64.E−02 | 7.91.E−02 | 6.22.E−02 | −1.09.E−02 | −3.09.E−02 | 1.27.E−02 | 9.71.E−03 |
| C | 2.79.E−03 | 3.63.E−02 | −6.14.E−02 | −2.52.E−02 | 8.18.E−03 | 1.58.E−02 | −2.59.E−03 | −2.53.E−03 |
| D | 7.62.E−03 | −3.01.E−02 | 3.52.E−02 | 7.74.E−03 | −3.38.E−03 | −5.83.E−03 | 3.86.E−04 | 4.88.E−04 |
| E | −9.15.E−03 | 1.75.E−02 | −1.58.E−02 | −1.92.E−03 | 7.78.E−04 | 1.47.E−03 | −4.10.E−05 | −6.90.E−05 |
| F | 5.70.E−03 | −7.14.E−03 | 5.49.E−03 | 3.84.E−04 | −9.97.E−05 | −2.56.E−04 | 3.11.E−06 | 7.17.E−06 |
| G | −2.32.E−03 | 2.10.E−03 | −1.44.E−03 | −6.00.E−05 | 5.15.E−06 | 3.18.E−05 | −1.73.E−07 | −5.51.E−07 |
| H | 6.56.E−04 | −4.50.E−04 | 2.83.E−04 | 6.99.E−06 | 4.36.E−07 | −2.85.E−06 | 7.29.E−09 | 3.13.E−08 |
| J | −1.31.E−04 | 7.03.E−05 | −4.09.E−05 | −5.89.E−07 | −1.03.E−07 | 1.85.E−07 | −2.47.E−10 | −1.31.E−09 |

Figure 22:
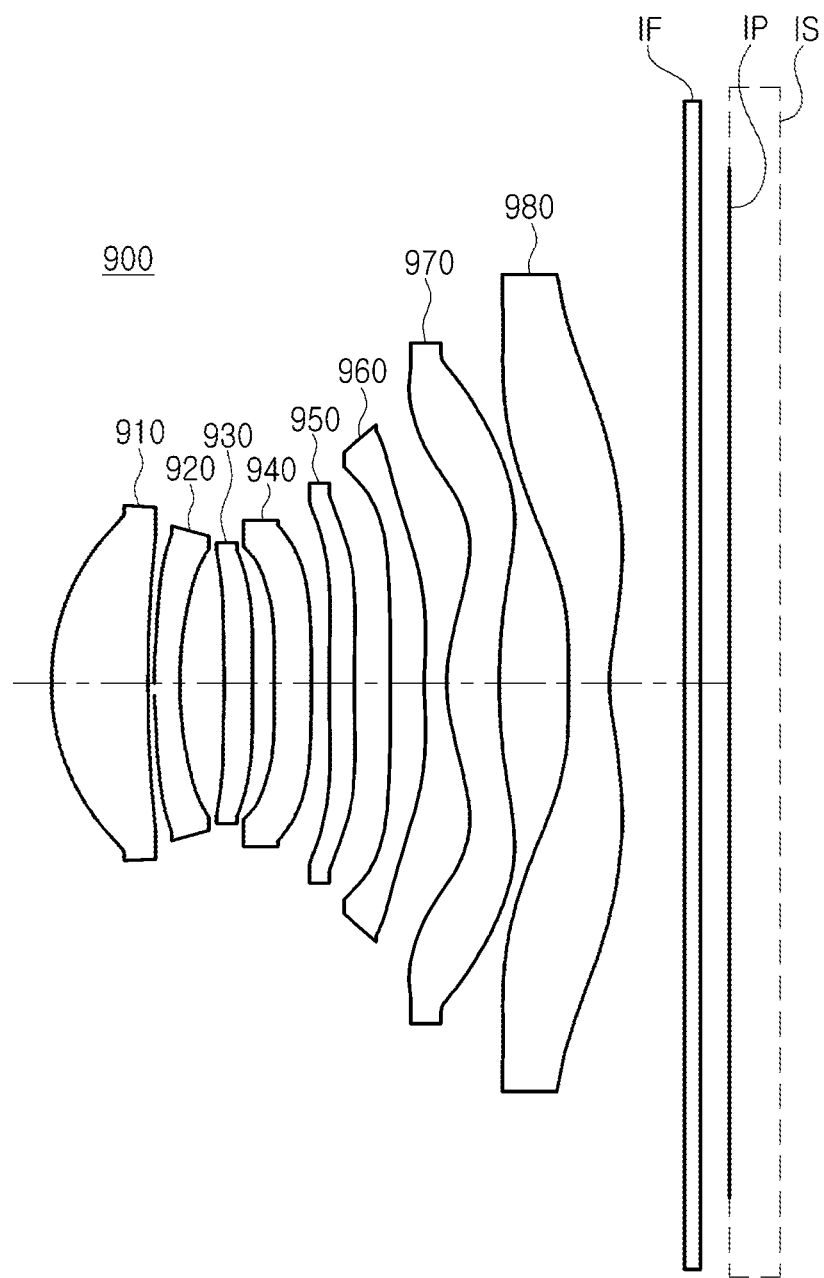
FIG. 22 is a configuration diagram of an imaging lens system according to a ninth example embodiment.

An imaging lens system according to a ninth example embodiment is described with reference to FIG. 22.

An imaging lens system 900 includes a first lens 910, a second lens 920, a third lens 930, a fourth lens 940, a fifth lens 950, a sixth lens 960, a seventh lens 970, and an eighth lens 980.

The first lens 910 has positive refractive power and has a convex object-side surface and a concave image-side surface. The second lens 920 has a negative refractive power and has a convex object-side surface and a concave image-side surface. The third lens 930 has positive refractive power and has a concave object-side surface and a convex image-side surface. The fourth lens 940 has a negative refractive power and has a concave object-side surface and a convex image-side surface. The fifth lens 950 has positive refractive power and has a convex object-side surface and a concave image-side surface. The sixth lens 960 has a negative refractive power and has a convex object-side surface and a concave image-side surface. In addition, an inflection point is formed on the object-side surface and the image-side surface of the sixth lens 960. The seventh lens 970 has positive refractive power and has a convex object-side surface and a concave image-side surface. In addition, an inflection point is formed on the object-side surface and the image-side surface of the seventh lens 970. The eighth lens 980 has a negative refractive power and has a concave object-side surface and a concave image-side surface. In addition, an inflection point is formed on the object-side surface and the image-side surface of the eighth lens 980.

The imaging lens system 900 may further include a stop ST (not shown), a filter IF, and an imaging plane IP. For example, the stop ST may be disposed between the second lens 920 and the third lens 930 or between the third lens 930 and the fourth lens 940. The filter IF may be disposed between the eighth lens 980 and the imaging plane IP. For reference, the stop ST and the filter IF may be omitted if necessary. The imaging plane IP may be formed in a position in which light incident from the first lens 910 to the eighth lens 980 is imaged. For example, the imaging plane IP may be formed on one surface of the image sensor IS of the camera module or inside the image sensor IS.

Figure 23:
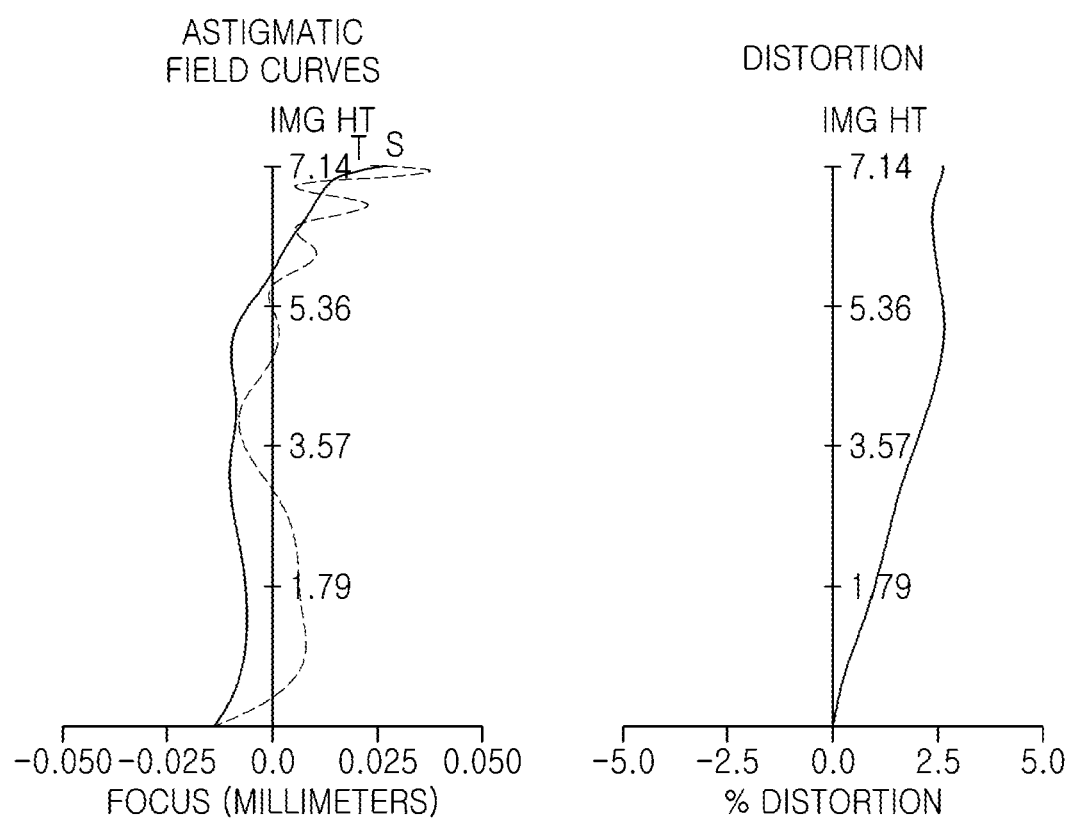
FIG. 23 is an aberration curve of the imaging lens system illustrated in FIG. 22.

The imaging lens system 900 configured as described above may exhibit aberration characteristics of the form illustrated in FIG. 23. Tables 17 and 18 show lens characteristics and aspheric values of the imaging lens system according to the present example embodiment.

TABLE 17

| Surface No. | Remark | Radius of curvature | Thickness/ distance | Refractive index | Abbe number |
|---|---|---|---|---|---|
| S1 | First lens | 3.207 | 1.358 | 1.546 | 56.0 |
| S2 | | 17.451 | 0.088 | | |
| S3 | Second lens | 9.468 | 0.356 | 1.677 | 19.2 |
| S4 | | 5.182 | 0.619 | | |
| S5 | Third lens | −350.628 | 0.407 | 1.546 | 56.0 |
| S6 | | −38.218 | 0.304 | | |
| S7 | Fourth lens | −17.518 | 0.518 | 1.667 | 20.4 |
| S8 | | −22.972 | 0.253 | | |
| S9 | Fifth lens | 93.681 | 0.364 | 1.546 | 56.0 |
| S10 | | 358.647 | 0.501 | | |
| S11 | Sixth lens | 37.077 | 0.486 | 1.570 | 37.4 |
| S12 | | 6.600 | 0.316 | | |
| S13 | Seventh lens | 2.641 | 0.737 | 1.546 | 56.0 |
| S14 | | 19.442 | 0.968 | | |
| S15 | Eighth lens | −47.262 | 0.583 | 1.537 | 55.7 |
| S16 | | 3.346 | 1.058 | | |
| S17 | Filter | | 0.210 | 1.518 | 64.2 |
| S18 | | | 0.376 | | |
| S19 | Imaging plane | | 0.014 | | |

TABLE 18

| Surface No. | S1 | S2 | S3 | S4 | S5 | S6 | S7 | S8 |
|---|---|---|---|---|---|---|---|---|
| K | −9.56.E−01 | 4.06.E+01 | 1.37.E+01 | 2.50.E+00 | 4.76.E+01 | 9.50.E+01 | 6.57.E+01 | 5.28.E+01 |
| A | 3.28.E−03 | −1.11.E−02 | −1.74.E−02 | −9.28.E−03 | −9.55.E−03 | −8.65.E−03 | −5.39.E−03 | 9.18.E−03 |
| B | 2.94.E−03 | 5.61.E−03 | 7.05.E−03 | 6.03.E−03 | −1.10.E−03 | −8.73.E−03 | −1.49.E−02 | −2.95.E−02 |
| C | −6.81.E−03 | 3.21.E−03 | 7.56.E−03 | −1.26.E−02 | 3.62.E−03 | 1.29.E−02 | 2.63.E−02 | 3.08.E−02 |
| D | 1.06.E−02 | −1.27.E−02 | −2.60.E−02 | 4.08.E−02 | −1.99.E−02 | −2.16.E−02 | −6.42.E−02 | −3.39.E−02 |
| E | −1.09.E−02 | 1.80.E−02 | 4.11.E−02 | −8.68.E−02 | 5.62.E−02 | 3.33.E−02 | 1.27.E−01 | 3.62.E−02 |
| F | 7.74.E−03 | −1.63.E−02 | −4.27.E−02 | 1.21.E−01 | −9.44.E−02 | −4.11.E−02 | −1.74.E−01 | −3.04.E−02 |
| G | −3.90.E−03 | 1.03.E−02 | 3.11.E−02 | −1.15.E−01 | 1.04.E−01 | 3.77.E−02 | 1.66.E−01 | 1.86.E−02 |
| H | 1.41.E−03 | −4.64.E−03 | −1.62.E−02 | 7.72.E−02 | −7.81.E−02 | −2.51.E−02 | −1.11.E−01 | −8.15.E−03 |
| J | −3.68.E−04 | 1.50.E−03 | 6.07.E−03 | −3.65.E−02 | 4.12.E−02 | 1.20.E−02 | 5.32.E−02 | 2.57.E−03 |

| Surface No. | S9 | S10 | S11 | S12 | S13 | S14 | S15 | S16 |
|---|---|---|---|---|---|---|---|---|
| K | 9.60.E+01 | 7.01.E+01 | 1.81.E+01 | −6.58.E+01 | −7.13.E+00 | 1.65.E+01 | 5.11.E+01 | −8.14.E+00 |
| A | 2.94.E−02 | 1.65.E−02 | −4.96.E−02 | −9.68.E−02 | −2.96.E−03 | 4.18.E−02 | −3.98.E−02 | −3.21.E−02 |
| B | −3.52.E−02 | −7.11.E−03 | 5.68.E−02 | 6.26.E−02 | −4.31.E−03 | −2.09.E−02 | 8.72.E−03 | 8.48.E−03 |
| C | 8.44.E−03 | −1.52.E−02 | −4.64.E−02 | −3.52.E−02 | 6.29.E−03 | −1.56.E−03 | −1.93.E−03 | |
| D | 5.54.E−03 | 1.81.E−02 | 2.94.E−02 | 1.76.E−02 | −1.38.E−03 | −1.61.E−03 | 3.46.E−04 | 3.58.E−04 |
| E | −5.81.E−03 | −1.15.E−02 | −1.48.E−02 | −7.24.E−03 | 4.82.E−04 | 3.46.E−04 | −6.55.E−05 | −5.04.E−05 |
| F | 2.83.E−03 | 5.25.E−03 | 5.83.E−03 | 2.32.E−03 | −1.10.E−04 | −5.88.E−05 | 8.57.E−06 | 5.22.E−06 |
| G | −9.74.E−04 | −1.85.E−03 | −1.75.E−03 | −5.55.E−04 | 1.72.E−05 | 7.65.E−06 | −7.65.E−07 | −3.95.E−07 |
| H | 2.65.E−04 | 5.11.E−04 | 3.94.E−04 | 9.70.E−05 | −1.87.E−06 | −7.49.E−07 | 4.75.E−08 | 2.18.E−08 |
| J | −5.83.E−05 | −1.08.E−04 | −6.55.E−05 | −1.22.E−05 | 1.44.E−07 | 5.47.E−08 | −2.09.E−09 | −8.69.E−10 |

Figure 24:
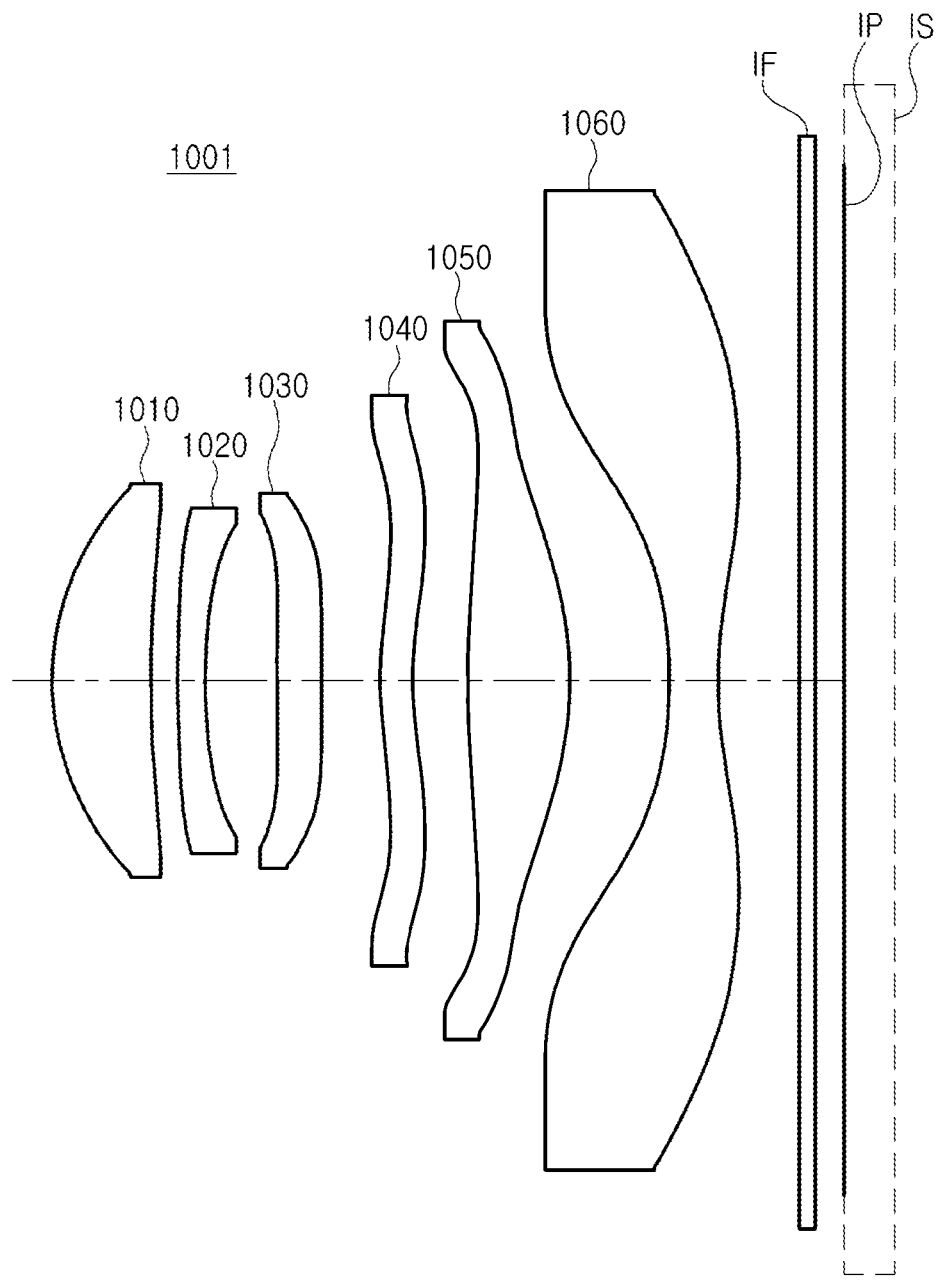
FIG. 24 is a configuration diagram of an imaging lens system according to a tenth example embodiment.

An imaging lens system according to a tenth example embodiment is described with reference to FIG. 24.

An imaging lens system 1001 includes a first lens 1010, a second lens 1020, a third lens 1030, a fourth lens 1040, a fifth lens 1050, and a sixth lens 1060.

The first lens 1010 has positive refractive power and has a convex object-side surface and a concave image-side surface. The second lens 1020 has a negative refractive power and has a convex object-side surface and a concave image-side surface. The third lens 1030 has positive refractive power and has a convex object-side surface and a concave image-side surface. The fourth lens 1040 has a negative refractive power and has a convex object-side surface and a concave image-side surface. An inflection point is formed on the object-side surface and the image-side surface of the fourth lens 1040. The fifth lens 1050 has positive refractive power and has a convex object-side surface and a convex image-side surface. In addition, an inflection point is formed on the object-side surface and the image-side surface of the fifth lens 1050. The sixth lens 1060 has a negative refractive power and has a concave object-side surface and a concave image-side surface. In addition, an inflection point is formed on the object-side surface and the image-side surface of the sixth lens 1060.

The imaging lens system 1001 may further include a stop ST (not shown), a filter IF, and an imaging plane IP. For example, the stop ST may be disposed between the second lens 1020 and the third lens 1030 or between the third lens 1030 and the fourth lens 1040. The filter IF may be disposed between the sixth lens 1060 and the imaging plane IP. For reference, the stop ST and the filter IF may be omitted if necessary. The imaging plane IP may be formed in a position in which light incident from the first lens 1010 to the sixth lens 1060 is imaged. For example, the imaging plane IP may be formed on one surface of the image sensor IS of the camera module or inside the image sensor IS.

Figure 25:
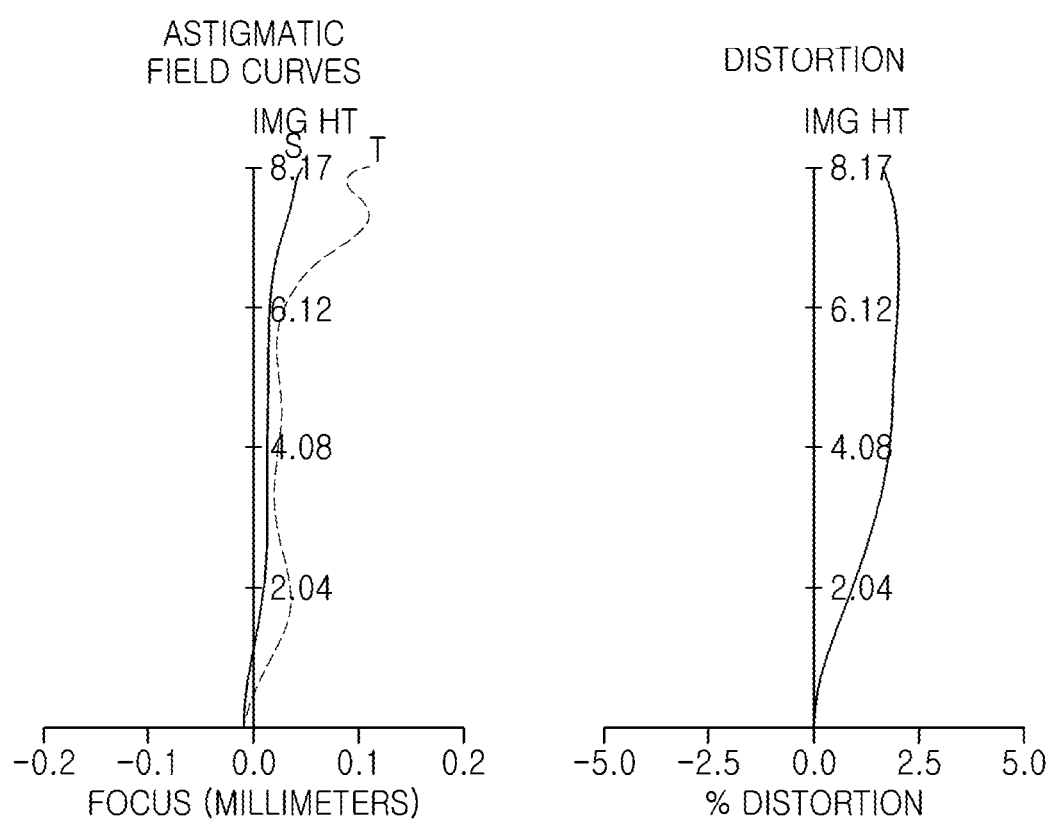
FIG. 25 is an aberration curve of the imaging lens system illustrated in FIG. 24.

The imaging lens system 1001 configured as described above may exhibit aberration characteristics of the form illustrated in FIG. 25. Tables 19 and 20 show lens characteristics and aspheric values of the imaging lens system according to the present example embodiment.

TABLE 19

| Surface No. | Remark | Radius of curvature | Thickness/ distance | Refractive index | Abbe number |
|---|---|---|---|---|---|
| S1 | First lens | 4.065 | 1.467 | 1.546 | 56.1 |
| S2 | | 15.731 | 0.393 | | |
| S3 | Second lens | 14.364 | 0.409 | 1.678 | 19.2 |
| S4 | | 7.069 | 1.070 | | |
| S5 | Third lens | 33.558 | 0.651 | 1.570 | 37.4 |
| S6 | | 105.829 | 0.882 | | |
| S7 | Fourth lens | 6.052 | 0.493 | 1.678 | 19.2 |
| S8 | | 5.375 | 0.817 | | |
| S9 | Fifth lens | 17.197 | 1.510 | 1.546 | 56.1 |
| S10 | | −4.799 | 1.477 | | |
| S11 | Sixth lens | −6.493 | 0.735 | 1.546 | 56.1 |
| S12 | | 6.216 | 11.166 | | |
| S13 | Filter | | 0.369 | 1.518 | 64.2 |
| S14 | | | −9.699 | | |
| S15 | Imaging plane | | 0.026 | | |

TABLE 20

| Surface No. | S1 | S2 | S3 | S4 | S5 | S6 |
|---|---|---|---|---|---|---|
| K | −1.03.E+00 | −1.20.E+01 | 2.23.E+01 | 4.16.E+00 | 9.13.E+01 | −7.93.E+01 |
| A | 1.23.E−03 | −4.57.E−03 | −1.11.E−02 | −9.54.E−03 | −1.07.E−02 | −1.01.E−02 |
| B | 8.44.E−04 | 3.06.E−03 | 5.77.E−03 | 7.25.E−03 | 4.38.E−03 | 1.01.E−03 |
| C | −4.68.E−04 | −2.01.E−03 | −3.75.E−03 | −5.65.E−03 | −4.01.E−03 | 5.54.E−05 |
| D | 1.86.E−04 | 8.97.E−04 | 2.03.E−03 | 3.41.E−03 | 2.33.E−03 | −2.52.E−04 |
| E | −4.99.E−05 | −2.56.E−04 | −7.20.E−04 | −1.31.E−03 | −8.96.E−04 | 1.09.E−04 |
| F | 8.90.E−06 | 4.64.E−05 | 1.61.E−04 | 3.15.E−04 | 2.19.E−04 | −2.51.E−05 |

TABLE 20-continued

| | | | | | | |
|---|---|---|---|---|---|---|
| G | −1.01.E−06 | −5.15.E−06 | −2.18.E−05 | −4.56.E−05 | −3.25.E−05 | 3.44.E−06 |
| H | 6.56.E−08 | 3.22.E−07 | 1.64.E−06 | 3.64.E−06 | 2.64.E−06 | −2.67.E−07 |
| J | −1.86.E−09 | −8.67.E−09 | −5.31.E−08 | −1.23.E−07 | −8.89.E−08 | 9.14.E−09 |

| Surface No. | S7 | S8 | S9 | S10 | S11 | S12 |
|---|---|---|---|---|---|---|
| K | −2.89.E+01 | −1.64.E+01 | −1.17.E+01 | −2.16.E+00 | −8.60.E+00 | −3.21.E−01 |
| A | −4.54.E−03 | −7.65.E−03 | −9.69.E−04 | 4.45.E−03 | −6.38.E−03 | −9.67.E−03 |
| B | −8.21.E−04 | 2.23.E−04 | −2.77.E−04 | −5.04.E−04 | 1.79.E−04 | 7.39.E−04 |
| C | 5.18.E−04 | 2.04.E−04 | 6.49.E−05 | 3.26.E−05 | 5.62.E−06 | −5.05.E−05 |
| D | −1.36.E−04 | −6.25.E−05 | −6.87.E−06 | 7.48.E−07 | 6.40.E−07 | 2.55.E−06 |
| E | 1.96.E−05 | 8.64.E−06 | 3.72.E−07 | −1.04.E−07 | −9.45.E−08 | −9.06.E−08 |
| F | −1.65.E−06 | −6.51.E−07 | −5.95.E−09 | −5.39.E−09 | 4.30.E−09 | 2.17.E−09 |
| G | 7.97.E−08 | 2.70.E−08 | −4.55.E−10 | 7.10.E−10 | −9.76.E−11 | −3.31.E−11 |
| H | −1.99.E−09 | −5.59.E−10 | 2.47.E−11 | −2.32.E−11 | 1.13.E−12 | 2.91.E−13 |
| J | 1.93.E−11 | 4.25.E−12 | −3.52.E−13 | 2.55.E−13 | −5.38.E−15 | −1.14.E−15 |

The example imaging lens systems described herein may include the following features. For example, a focal length of the imaging lens system is 7 to 12 mm, a TTL of the imaging lens system is 8.0 to 13.0 mm, a focal length of the first lens is 5.0 to 9.0 mm, and a focal length of the second lens is −22 to −10 mm, a focal length of the third lens is 28 to 600 mm, a focal length of the fourth lens is −300 to 2000 mm, a focal length of the fifth lens is 80 to 1000 mm, a focal length of the sixth lens is −14.0 to −5.0 mm, a focal length of the seventh lens is 3.0 to 6.0 mm, and a focal length of the eighth lens is −8.0 to −3.0 mm.

Tables 21 to 26 are optical characteristic values and conditional expression values of the imaging lens systems according to the first to eighth example embodiments.

TABLE 21

| Remark | First example embodiment | Second example embodiment | Third example embodiment | Fourth example embodiment | Fifth example embodiment |
|---|---|---|---|---|---|
| f1 | 6.6229 | 6.5654 | 6.5853 | 6.5908 | 6.8482 |
| f2 | −12.0030 | −12.9752 | −14.9109 | −13.1736 | −13.9002 |
| f3 | 30.1617 | 50.0600 | 135.9451 | 36.4419 | 73.8936 |
| f4 | −200.2009 | −201.5306 | −246.7688 | −68.5367 | 314.1510 |
| f5 | 218.5422 | 292.2685 | 928.5065 | 203.5326 | 92.5928 |
| f6 | −12.1918 | −8.7033 | −8.1157 | −11.4395 | −7.6803 |
| f7 | 4.8525 | 4.4655 | 4.0079 | 5.1509 | 4.1442 |
| f8 | −5.5511 | −6.1278 | −5.6780 | −5.9420 | −5.9498 |
| TTL | 9.4150 | 9.8252 | 9.8250 | 9.8620 | 9.7300 |
| BFL | 2.1833 | 2.1500 | 2.6504 | 1.9411 | 2.1904 |
| BFLx | 2.1833 | 2.1500 | 2.6504 | 1.9411 | 2.1904 |
| BFLm | 0.6000 | 0.6000 | 0.6000 | 0.6000 | 0.6000 |
| f | 8.1546 | 8.4780 | 8.8400 | 8.4607 | 8.4012 |
| f number | 1.7500 | 1.7811 | 1.9632 | 1.8008 | 1.6902 |
| ImgHT | 7.1450 | 7.1450 | 7.1450 | 7.1450 | 7.1450 |
| HFOV | 40.4966 | 39.4386 | 38.2454 | 39.5079 | 39.4990 |

TABLE 22

| Remark | Sixth example embodiment | Seventh example embodiment | Eighth example embodiment | Ninth example embodiment | Tenth example embodiment |
|---|---|---|---|---|---|
| f1 | 6.2849 | 5.5305 | 8.4399 | 6.9634 | 9.6144 |
| f2 | −13.9854 | −12.5094 | −20.7604 | −17.4984 | −21.0166 |
| f3 | 370.9377 | 126.0281 | 552.8804 | 78.5540 | 85.8765 |
| f4 | 1317.6348 | −306.4859 | −167.8726 | −115.0961 | −100.4271 |
| f5 | 244.1881 | 420.4005 | 217.0955 | 232.2172 | 7.0433 |
| f6 | −7.6079 | −6.2904 | −7.7851 | −14.1699 | −5.7004 |
| f7 | 3.8463 | 3.2518 | 4.1978 | 5.5136 | — |
| f8 | −5.5266 | −4.8255 | −6.8581 | −5.8006 | — |
| TTL | 9.3750 | 8.2250 | 12.6630 | 9.5151 | 11.7649 |

TABLE 22-continued

| Remark | Sixth example embodiment | Seventh example embodiment | Eighth example embodiment | Ninth example embodiment | Tenth example embodiment |
|---|---|---|---|---|---|
| BFL | 2.5430 | 2.2317 | 4.1547 | 1.6576 | 1.8611 |
| BFLx | 2.5430 | 2.2317 | 4.1547 | 1.6576 | 1.8611 |
| BFLm | 0.6000 | 0.6000 | 0.6000 | 0.6000 | 0.6000 |
| f | 8.4263 | 7.3572 | 11.5802 | 8.0522 | 9.6773 |
| f number | 1.9597 | 1.9512 | 1.9869 | 1.7318 | 1.6900 |
| ImgHT | 6.8060 | 6.0000 | 8.3660 | 7.3500 | 8.1660 |
| HFOV | 38.2018 | 38.4869 | 35.1285 | 41.6915 | 39.6250 |

TABLE 23

| Conditional expression | First example embodiment | Second example embodiment | Third example embodiment | Fourth example embodiment | Fifth example embodiment |
|---|---|---|---|---|---|
| V1−V2 | 32.499 | 32.031 | 35.613 | 32.031 | 34.454 |
| V1−V3 | 0.255 | 0 | 0 | 0 | 0 |
| V1−V4 | 32.499 | 30.054 | 32.499 | 30.054 | 35.613 |
| V1−V5 | 0.000 | 0.000 | 0.000 | 0.000 | 0.000 |
| f3/f | 3.699 | 5.905 | 15.378 | 4.307 | 8.796 |
| f4/f | −24.551 | −23.771 | −27.915 | −8.101 | 37.393 |
| f5/f | 26.800 | 34.474 | 105.035 | 24.056 | 11.021 |
| f6/f | −1.495 | −1.027 | −0.918 | −1.352 | −0.914 |
| f7/f | 0.595 | 0.527 | 0.453 | 0.609 | 0.493 |
| f8/f | −0.681 | −0.723 | −0.642 | −0.702 | −0.708 |
| TTL/f | 1.155 | 1.159 | 1.111 | 1.166 | 1.158 |
| f1/f2 | −0.552 | −0.506 | −0.442 | −0.500 | −0.493 |
| f2/f3 | −0.398 | −0.259 | −0.110 | −0.361 | −0.188 |
| BFL/f | 0.268 | 0.254 | 0.300 | 0.229 | 0.261 |
| D12/f | 0.005 | 0.005 | 0.006 | 0.005 | 0.005 |
| TTL/2ImgHT | 0.659 | 0.688 | 0.688 | 0.690 | 0.681 |
| (TTL−BFL)/2ImgHT | 0.506 | 0.537 | 0.502 | 0.554 | 0.528 |
| BFL/TTL | 0.232 | 0.219 | 0.270 | 0.197 | 0.225 |

TABLE 24

| Conditional expression | Sixth example embodiment | Seventh example embodiment | Eighth example embodiment | Ninth example embodiment | Tenth example embodiment |
|---|---|---|---|---|---|
| V1-V2 | 35.613 | 35.613 | 36.752 | 36.7521 | 36.8679 |
| V1-V3 | 0 | 0 | 0 | 0 | 18.7567 |
| V1-V4 | 32.499 | 32.499 | 32.499 | 35.6132 | 36.8679 |
| V1-V5 | 0.000 | 0.000 | 0.000 | 0 | 0 |
| f3/f | 44.021 | 17.130 | 47.744 | 9.7556 | 8.8740 |
| f4/f | 156.371 | −41.658 | −14.497 | −14.2938 | −10.3776 |
| f5/f | 28.979 | 57.142 | 18.747 | 28.8390 | 0.7278 |
| f6/f | −0.903 | −0.855 | −0.672 | −1.7598 | −0.5890 |
| f7/f | 0.456 | 0.442 | 0.363 | 0.6847 | 0 |
| f8/f | −0.656 | −0.656 | −0.592 | −0.7204 | 0 |
| TTL/f | 1.113 | 1.118 | 1.094 | 1.1817 | 1.2157 |
| f1/f2 | −0.449 | −0.442 | −0.407 | −0.3979 | −0.4575 |
| f2/f3 | −0.038 | −0.099 | −0.038 | −0.2228 | −0.2447 |
| BFL/f | 0.302 | 0.303 | 0.359 | 0.2059 | 0.1923 |
| D12/f | 0.008 | 0.006 | 0.012 | 0.0109 | 0.0406 |
| TTL/2ImgHT | 0.689 | 0.685 | 0.757 | 0.6473 | 0.7204 |
| (TTL-BFL)/2ImgHT | 0.502 | 0.499 | 0.509 | 0.5345 | 0.6064 |
| BFL/TTL | 0.271 | 0.271 | 0.328 | 0.1742 | 0.1582 |

TABLE 25

| Conditional expression | First example embodiment | Second example embodiment | Third example embodiment | Fourth example embodiment | Fifth example embodiment |
|---|---|---|---|---|---|
| ImgHT | 7.1450 | 7.1450 | 7.1450 | 7.1450 | 7.1450 |
| T1/ImgHT | 0.1683 | 0.1936 | 0.1802 | 0.1892 | 0.1819 |
| BFL/ImgHT | 0.3056 | 0.3009 | 0.3709 | 0.2717 | 0.3066 |
| D18/BFL | 3.3122 | 3.5699 | 2.7070 | 4.0805 | 3.4422 |
| EPD/ImgHT | 0.6522 | 0.6662 | 0.6302 | 0.6576 | 0.6957 |
| EPD/BFL | 2.1343 | 2.2139 | 1.6990 | 2.4204 | 2.2693 |
| SUMT/SUMD | 1.6559 | 2.0400 | 1.6083 | 2.1203 | 1.4541 |
| SUMT/BFL | 2.0651 | 2.3956 | 1.6691 | 2.7728 | 2.0396 |
| SUMD/BFL | 1.2471 | 1.1743 | 1.0378 | 1.3078 | 1.4026 |

TABLE 26

| Conditional expression | Sixth example embodiment | Seventh example embodiment | Eighth example embodiment | Ninth example embodiment | Tenth example embodiment |
|---|---|---|---|---|---|
| ImgHT | 6.8060 | 6.0000 | 8.3660 | 7.3500 | 8.1660 |
| T1/ImgHT | 0.1797 | 0.1809 | 0.1884 | 0.1847 | 0.1796 |
| BFL/ImgHT | 0.3736 | 0.3719 | 0.4966 | 0.2255 | 0.2279 |
| DL1LP/BFL | 2.6865 | 2.6856 | 2.0479 | 4.7402 | 6.3214 |
| EPD/ImgHT | 0.6318 | 0.6284 | 0.6967 | 0.6326 | 0.7012 |
| EPD/BFL | 1.6908 | 1.6896 | 1.4028 | 2.8049 | 3.0768 |
| SUMT/SUMD | 1.5932 | 1.6773 | 1.7805 | 1.5772 | 1.1351 |
| SUMT/BFL | 1.6506 | 1.6825 | 1.3114 | 2.9009 | 2.8290 |
| SUMD/BFL | 1.0360 | 1.0031 | 0.7365 | 1.8393 | 2.4924 |

As set forth above, the imaging lens system may be mounted in thin, portable electronic devices.

While specific example embodiments have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An imaging lens system comprising:
   a first lens, a second lens, a third lens, a fourth lens, a fifth lens, a sixth lens, a seventh lens, and an eighth lens sequentially disposed from an object-side, wherein 0.15<BFL/TTL and 1.9 mm<BFL<2.8 mm are satisfied, where BFL is a distance from an image-side surface of the eighth lens to an imaging plane and TTL is a distance from an object-side surface of the first lens to the imaging plane.

2. The imaging lens system of claim 1, wherein 5.0 mm≤ImgHT≤9.0 mm is satisfied, wherein ImgHT is a height of the imaging plane.

3. The imaging lens system of claim 2, wherein 0.1<T1/ImgHT<0.2 is satisfied, where T1 is a thickness of the first lens at the center of an optical axis.

4. The imaging lens system of claim 1, wherein 0<f1/f<2.0 is satisfied, where f1 is a focal length of the first lens and f is a focal length of the imaging lens system.

5. The imaging lens system of claim 1, wherein −3.5<f2/f<0 is satisfied, where f2 is a focal length of the second lens and f is a focal length of the imaging lens system.

6. The imaging lens system of claim 1, wherein 0.8<TTL/f<1.2 is satisfied, where f is a focal length of the imaging lens system.

7. The imaging lens system of claim 2, wherein (TTL-BFL)/2ImgHT<0.65 is satisfied, where 2ImgHT is a diagonal length of the imaging plane.

8. The imaging lens system of claim 1, wherein 0<f7/f<0.8 is satisfied, where f7 is a focal length of the seventh lens and f is a focal length of the imaging lens system.

9. The imaging lens system of claim 1, wherein 1.3<SUMT/BFL<2.8 is satisfied, where SUMT is a sum of thicknesses of the first to eighth lens in the center of the optical axis.

10. A camera module comprising:
the imaging lens system of claim 1; and
an image sensor comprising an imaging surface disposed at the imaging plane of the imaging lens system,
wherein the image sensor converts an image of an object formed on an effective imaging area of the imaging surface by the lenses of the imaging lens system into an electrical signal.

11. A portable terminal comprising:
a housing; and
the camera module of claim 10 disposed in the housing.

12. An imaging lens system comprising:
a first lens having positive refractive power;
a second lens having refractive power;
a third lens having positive refractive power;
a fourth lens having refractive power;
a fifth lens having refractive power; and
a sixth lens having negative refractive power,
wherein 2.0<DL1LP/BFL<4.2 is satisfied, where DL1LP is a distance from an object-side surface of the first lens to an image-side surface of a rearmost lens, a lens closest to an imaging plane, and BFL is a distance from the image-side surface of the rearmost lens to the imaging plane.

13. The imaging lens system of claim 12, wherein the fourth lens has negative refractive power.

14. The imaging lens system of claim 12, wherein the fifth lens has positive refractive power.

15. The imaging lens system of claim 12, wherein the fourth lens has a concave image-side surface.

16. The imaging lens system of claim 12, wherein 0.15<BFL/TTL<0.40 is satisfied, where TTL is a distance from an object-side surface of the first lens to the imaging plane.

17. The imaging lens system of claim 12, wherein 1.0<TTL/f<1.3 is satisfied, where TTL is a distance from the object-side surface of the first lens to the imaging plane, and f is a focal length of the imaging lens system.

18. A camera module comprising:
the imaging lens system of claim 12; and
an image sensor comprising an imaging surface disposed at the imaging plane of the imaging lens system,
wherein the image sensor converts an image of an object formed on an effective imaging area of the imaging surface by the lenses of the imaging lens system into an electrical signal, and
wherein the imaging lens system is movable toward the image sensor and 0.6<(BFLx-BFLm)/BFLx<0.8 is satisfied, where BFLx is a distance from an image-side surface of a rearmost lens closest to the image sensor to the image sensor in a state in which the imaging lens system is located farthest from the image sensor, and BFLm is a distance from the image-side surface of the rearmost lens to the image sensor in a state in which the imaging lens system is located closest to the image sensor.

19. A portable terminal comprising:
a housing; and
the camera module of claim 18 disposed in the housing.

20. A camera module comprising:
an imaging lens system including a first lens, a second lens, a third lens, a fourth lens, a fifth lens, and a sixth lens being sequentially arranged from an object-side surface; and
an image sensor,
wherein the imaging lens system is movable toward the image sensor and 0.6<(BFLx−BFLm)/BFLx<0.8 is satisfied, where BFLx is a distance from an image-side surface of a rearmost lens closest to the image sensor to the image sensor in a state in which the imaging lens system is located farthest from the image sensor, and BFLm is a distance from the image-side surface of the rearmost lens to the image sensor in a state in which the imaging lens system is located closest to the image sensor.

21. The camera module of claim 20, wherein the imaging lens system further comprises one or more additional lenses disposed on an image side of the sixth lens toward the image sensor, and
wherein 0.15<BFL/TTL and 1.9 mm<BFL are satisfied, wherein BFL is a distance from the image-side surface of the rearmost lens to an imaging plane of the image sensor and TTL is a distance from an object-side surface of the first lens to the imaging plane.

22. A portable terminal comprising:
a housing;
the camera module of claim 20 disposed in the housing; and
one or more other camera modules.

23. A camera module comprising:
a first barrel accommodating a second barrel;
an imaging lens system disposed in the second barrel; and
an image sensor disposed in the first barrel, and comprising an imaging surface disposed at the imaging plane of the imaging lens system,
wherein the second barrel is movable to at least partially protrude from the first barrel,
wherein the imaging lens system comprises seven or more lenses, and
wherein 0.15<BFL/TTL and 1.9 mm<BFL are satisfied, where BFL is a distance from an image-side surface of the rearmost lens closest to the image sensor to the imaging plane and TTL is a distance from an object-side surface of the first lens to the imaging plane.

24. The camera module of claim 23, wherein the seven or more lenses comprise:
a first lens having positive refractive power;
a second lens having refractive power;
a third lens having positive refractive power;
a fourth lens having refractive power;
a fifth lens having refractive power; and
a sixth lens having negative refractive power, and
wherein the first lens through sixth lens are sequentially disposed from an object-side.

* * * * *